United States Patent
Leslie

(10) Patent No.: US 10,586,212 B2
(45) Date of Patent: Mar. 10, 2020

(54) JOB MATCHING APPLICATION, METHOD, AND SYSTEM

(71) Applicant: Swipejobs, Inc., Austin, TX (US)

(72) Inventor: Katrina Lee-Anne Leslie, New South Wales (AU)

(73) Assignee: Swipejobs, Inc., Southlake, TX (US)

( * ) Notice: Subject to any disclaimer, the term of this patent is extended or adjusted under 35 U.S.C. 154(b) by 601 days.

(21) Appl. No.: 15/141,548

(22) Filed: Apr. 28, 2016

(65) Prior Publication Data
US 2016/0321614 A1    Nov. 3, 2016

Related U.S. Application Data

(60) Provisional application No. 62/153,585, filed on Apr. 28, 2015.

(51) Int. Cl.
*G06Q 10/06* (2012.01)
*G06Q 10/10* (2012.01)

(52) U.S. Cl.
CPC ... *G06Q 10/1053* (2013.01); *G06Q 10/06398* (2013.01)

(58) Field of Classification Search
USPC ........................................................ 705/7.42
See application file for complete search history.

(56) References Cited

U.S. PATENT DOCUMENTS

| | | | |
|---|---|---|---|
| 2004/0024761 A1* | 2/2004 | Kolbe | G06Q 10/06 |
| 2006/0265270 A1* | 11/2006 | Hyder | G06Q 10/10 |
| | | | 705/321 |
| 2008/0046170 A1* | 2/2008 | DeGrazia | G01C 21/20 |
| | | | 701/420 |
| 2009/0070126 A1 | 3/2009 | MacDaniel et al. | |

(Continued)

FOREIGN PATENT DOCUMENTS

WO    WO 2015/051421 A1    4/2015

OTHER PUBLICATIONS

Aytug et al. (A review of Machine Learning in Scheduling, IEEE Transactions on Engineering Management (vol. 41 , Issue: 2 , May 1994 ), pp. 165-171 Published in May 1994).*

(Continued)

*Primary Examiner* — Johnna R Loftis
*Assistant Examiner* — Matthew D Henry
(74) *Attorney, Agent, or Firm* — Patterson Thuente Pedersen, P.A.

(57) ABSTRACT

A method, server, and computer program for matching jobs and workers. The server is configured to receive, from entities, job data indicative of available jobs; receive from mobile devices associated with workers, worker data; store the job data and the worker data in the data store; determine and store, in the data store, worker preference data and entity preference data; determine matches, wherein each match pairs one of the workers with one of the jobs based on the worker preference data and the entity preference data; transfer, to each matched worker via a respective mobile device, data indicative of the respective matched job; receive, from at least some of the mobile devices, feedback data indicative of whether at least some of the matched jobs were accepted or declined; and transfer, to the respective entity for each accepted job, data indicative of the respective worker who accepted the job.

19 Claims, 27 Drawing Sheets

(56) References Cited

U.S. PATENT DOCUMENTS

| | | |
|---|---|---|
| 2010/0324970 A1 | 12/2010 | Phelon et al. |
| 2012/0095931 A1 | 4/2012 | Gurion et al. |
| 2013/0024105 A1 | 1/2013 | Thomas |
| 2013/0282626 A1 | 10/2013 | White et al. |
| 2014/0074824 A1* | 3/2014 | Rad .................. G06Q 50/01 707/722 |
| 2014/0136314 A1 | 5/2014 | Kiet et al. |

OTHER PUBLICATIONS

Sullivan P., A Dynamic Analysis of Educational Attainment, Occupational Choices, and Job Search, 65 pgs, Sep. 2006.
Siting Z., Job Recommender Systems: A Survey, The 7th International Conference on Computer Science and Education (ICCSE 2012), Melbourne, Australia, 5 pgs., Jul. 14-17, 2012.
Application and File history for U.S. Appl. No. 15/028,584, filed Apr. 11, 2016. Inventors: Leslie.
International Appln No. PCT/AU2014/050284; Written Opinion/Search Report, 12 pages, dated Nov. 7, 2014.

* cited by examiner

JOB MATCHING APPLICATION, METHOD, AND SYSTEM

RELATED APPLICATION

The present application claims the benefit of U.S. Provisional Application No. 62/153,585 filed Apr. 28, 2015, which is incorporated herein in its entirety by reference.

FIELD OF INVENTION

The present invention relates to a method, system, mobile device, software product, server processing system, and one or more computer readable mediums for enabling matching of jobs and workers.

BACKGROUND

Currently, when a job seeker (i.e. potential employee) conducts a search for a job via a search engine, the job seeker is generally required to input details such as a keyword related to the job they are searching for such as job title, location and terms of employment (i.e. full time, part time, etc.).

Additionally, when an employer wishes to identify potential employees for a particular job that needs to be filled, it is common that the employer will place a job advertisement with a job classified website or the like. However, the employer must then filter through the applications from potential employees which can be a tedious task. Another common technique is that the employer may engage a recruiter to identify potential employees. This is not ideal, as the recruiter may not have fully appreciated the skill set that the potential employee requires for the employer, thus time is wasted in finding the appropriate employee. Furthermore, the cost of using a recruiter is considerable.

Additionally, it has been identified that particular jobs are not being filled by job seekers despite there being a sufficient supply of labor to fill such jobs. This is generally due to a mixture of employers defining restrictive criteria for a job classified which reduces the number of potential job seekers which can satisfy the specified criteria, and job seekers who are unaware of particular criteria which would present further job opportunities for the job seeker.

Therefore there is a need to overcome or at least alleviate one or more of the above-mentioned problems or provide a useful alternative.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavor to which this specification relates.

SUMMARY

In a first aspect there is provided a method including:

receiving, at a server processing system job data indicative of available jobs associated with one or more entities, wherein the job data includes entity requirements for the available jobs;

receiving, at the server processing system worker data indicative of a plurality of workers, wherein the worker data is indicative of at least one of one or more skills, experience and one or more certifications of each worker;

storing the job data and the worker data in a data store;

determining and storing, in the data store, entity preference data and worker preference data;

determining matches by the server processing system, wherein each match dynamically pairs the worker with jobs based on the worker data, the worker preference data, the entity requirements and the entity preference data;

transferring, from the server processing system to each matched worker via a respective mobile device, data indicative of the respective matched jobs;

receiving, by the server processing system from at least some of the mobile devices, feedback data indicative of whether at least some of the matched jobs were accepted or declined; and transferring, from the server processing system to the respective entity for each accepted job, data indicative of the respective worker who accepted the job.

In certain embodiments, the method includes:

updating, by the server processing system in real time, the matches in response to receiving new data for storage in the data store or data indicative of a change to data stored in the data store; and transferring, from the server processing system in real time, data to one or more mobile devices in response to an updated match for the one or more respective workers.

In certain embodiments, the method includes the server processing system updating the worker preference data based on the feedback data.

In certain embodiments, the data transferred to at least some of the matched workers via their respective mobile device is indicative of a job card stack including a plurality of job cards.

In certain embodiments, the method includes:

the server processing system obtaining, for at least some of the mobile devices, gesture data based on the respective worker's interaction with an input device of the mobile device; and the server processing system generating the feedback data based on the gesture data.

In certain embodiments, the gesture data includes:

a first swiping gesture in a first direction in relation to one of the job cards to indicate acceptance of the respective job; and a second swiping gesture in a second direction opposite and parallel to the first direction in relation to one of the job cards to indicate declination of the respective job.

In certain embodiments, the worker data for each worker is indicative of temporal availability and wherein the entity requirements of each job include temporal job requirements, wherein the method includes the server processing system determining the matches further based on the temporal availability and the temporal job requirements.

In certain embodiments, the method includes the server processing system receiving rating data for one of the workers based on completion of the respective accepted job, wherein the method includes:

the server processing system updating, in real time, the matches in response to receiving the rating data; and the server processing system transferring data to one or more mobile devices in response to an updated match for the one or more respective workers.

In certain embodiments, the worker data for each worker is further indicative of at least one of:

one or more selected industries which the worker is willing to accept a job within;

a match radius based on a preferred job location;

availability for work;

methods of transport available to the worker;

work history;
a worker rating;
a worker satisfaction rating and
social media habits of the worker.

In certain embodiments, the worker preference data for each worker is indicative of a distance which the respective worker is willing to travel.

In certain embodiments, the distance which the respective worker is willing to travel is determined based on:
the server processing system receiving, from the respective, a nominated distance to travel; and
the server processing system refining the nominated distance to travel based on the feedback data.

In certain embodiments, the method includes for each accepted job, presenting, via the respective mobile device, a reminder notification a predetermined time prior to a start time for the respective job.

In certain embodiments, the method includes receiving, from one of the workers, a cancellation of an accepted job, wherein the method includes:
the server processing system updating, in real time, the matches in response to receiving the cancellation;
the server processing system transferring data to the respective entity indicating the cancellation;
the server processing system transferring, in real time, data to one or more mobile devices in response to an updated match for the one or more respective workers; and
the server processing system updating future matching based on the cancellation In certain embodiments, the method includes:
receiving, at the server processing system from one of the workers who completed the respective accepted job, a worker satisfaction rating; and
updating, by the server processing system, the worker preference data according to the worker satisfaction rating.

In certain embodiments, the method includes presenting, via the respective mobile device including a location receiver, directions to a location of the accepted job determined based upon a current location determined by the location receiver.

In certain embodiments, the method includes:
receiving, at the server processing system, nominated workers from at least some of the one or more entities; and
transferring, from the server processing system, to the nominated workers, data indicative of the respective job which the respective entity has nominated the respective worker.

In certain embodiments, the method includes the server processing system dynamically using matching factors to produce a sorted order of job cards for the worker to view.

In certain embodiments, the jobs are contract jobs and short term jobs.

In certain embodiments, the one or more entities include at least one of:
an employer of the workers; and
a customer of the employer of the workers.

In a second aspect there is provided server processing system including a processor and a data store, wherein the processor is configured to:
receive, at a server processing system job data indicative of available jobs associated with entities, wherein the job data includes entity requirements for the available jobs;
receive, at the server processing system worker data indicative of a plurality of workers, wherein the worker data is indicative of at least one of one or more skills, experience and one or more certifications of each worker;
store the job data and the worker data in the data store;
determine and store, in the data store, entity preference data and worker preference data;
determine matches by the server processing system, wherein each match dynamically pairs the worker with jobs based on the worker data, the worker preference data, the entity requirements and the entity preference data;
transfer, from the server processing system to each matched worker via a respective mobile device, data indicative of the respective matched jobs;
receive, by the server processing system from at least some of the mobile devices, feedback data indicative of whether at least some of the matched jobs were accepted or declined; and
transfer, from the server processing system to the respective entity for each accepted job, data indicative of the respective worker who accepted the job.

In a third aspect there is provided a non-transient computer readable medium including executable instructions which, when executed, configure a processor of a server processing system to:
receive, at a server processing system job data indicative of available jobs associated with entities, wherein the job data includes entity requirements for the available jobs;
receive, at the server processing system worker data indicative of a plurality of workers, wherein the worker data is indicative of at least one of one or more skills, experience and one or more certifications of each worker;
store the job data and the worker data in a data store;
determine and store, in the data store, entity preference data and worker preference data;
determine matches by the server processing system, wherein each match dynamically pairs the worker with jobs based on the worker data, the worker preference data, the entity requirements and the entity preference data;
transfer, from the server processing system to each matched worker via a respective mobile device, data indicative of the respective matched jobs;
receive, by the server processing system from at least some of the mobile devices, feedback data indicative of whether at least some of the matched jobs were accepted or declined; and
transfer, from the server processing system to the respective entity for each accepted job, data indicative of the respective worker who accepted the job.

Other aspects and embodiments will be appreciated throughout the description provided herein.

BRIEF DESCRIPTION OF THE FIGURES

Example embodiments should become apparent from the following description, which is given by way of example only, of at least one preferred but non-limiting embodiment, described in connection with the accompanying figures.

Figure 1:
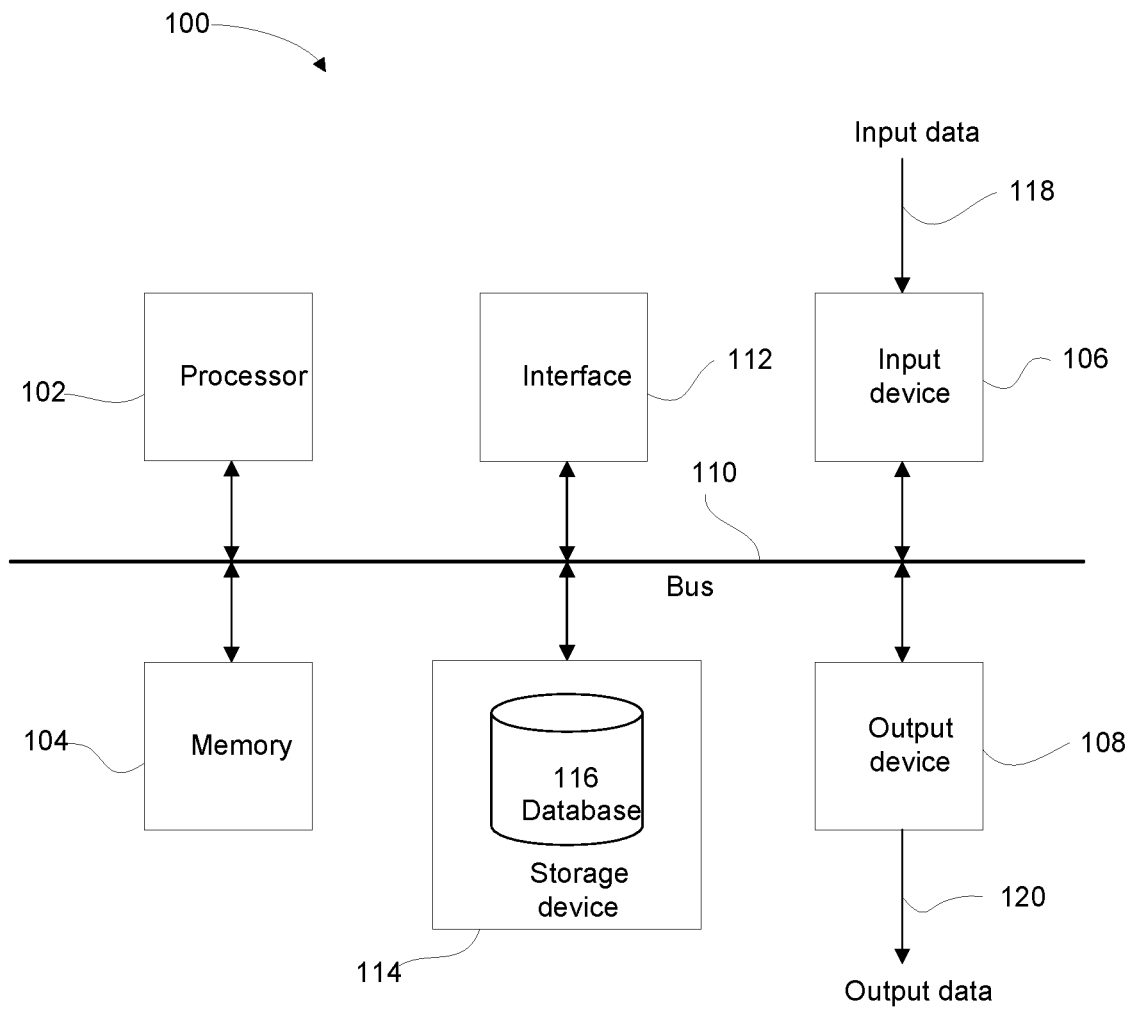
FIG. 1 illustrates a functional block diagram of an example processing device that can be utilized to embody or give effect to a particular embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF EXAMPLE EMBODIMENTS

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Throughout the description particular terms have been used with the following definitions. The term "worker" herein means a person who is employed to complete work associated with a job. The term "entity" is herein defined to include an organization that is legally liable for the worker, such as an employer of the worker, or a customer or partner requiring the services of the worker. In some instances, the organization that is legally liable for the worker is also a customer or partner.

Overview

Embodiments relate to a method, server processing system, system, interface and/or one or more non-transient computer readable mediums configured to match jobs to workers. In some embodiments, the jobs are contracts jobs and short term jobs which can be completed by temporary labor. Worker preferences indicative of particular job characteristics considered important to each worker and entity preferences indicative of particular worker characteristics can be considered to determine worker/job matches. The matching can be performed using a matching algorithm which improves the exchange between workers seeking employment and entities seeking workers for particular jobs that need to be filled on demand. The preferences of workers and entities can be largely inferred automatically using machine learning and/or refined based on initial input from a user (worker or entity).

In some embodiments, workers are able browse matched jobs served by the server processing system to their mobile device. In some cases, entities are able to browse worker profiles. A server processing system maintains a user profile (worker profile or entity profile) that is updated based on feedback data received from the user's interaction with previously presented jobs or worker profiles via the mobile device such that matched jobs which are served to the worker over time are optimized such that the match is optimized for both the worker and the entity.

The mobile device is configured according to a mobile application. In relation to a worker, the mobile application configures the mobile device to present one or more job cards to the user of the mobile device. The mobile application enables collection of information in relation to the worker's work details.

The server processing system serves a plurality of job cards representing a plurality of available matched jobs from a database to the worker's mobile device based on the worker's profile matching the entity's profile. Upon receiving the plurality of job cards, the worker is presented with a job stack interface wherein the worker accepts or declines each job to progress through the job stack interface via interaction with the Graphical User Interface (GUI) of the mobile application. In particular, the worker can swipe a job card in a first direction (e.g. left) to decline the job classified, or by swiping the job card in a second and opposite direction (e.g. right) to accept the job. Over time feedback of the user's interaction with job cards can be analyzed to refine worker preferences of the worker profile.

Example Processing System

A particular embodiment of the present invention can be realized using a processing device, an example of which is shown in FIG. 1. In particular, the processing device 100 generally includes at least one processor 102, or processing unit or plurality of processors, memory 104, at least one input device 106, and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing device 100.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD, Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialized purpose. The processor 102 receives instructions as input data 118 via input device 106 and can display processed results or other output to a user by utilizing output device 108. More than one input device 106 and/or output device 108 can be provided. It should be appreciated that the processing device 100 may be any form of terminal, PC, laptop, notebook, tablet, smart phone, specialized hardware, or the like.

Figure 2:
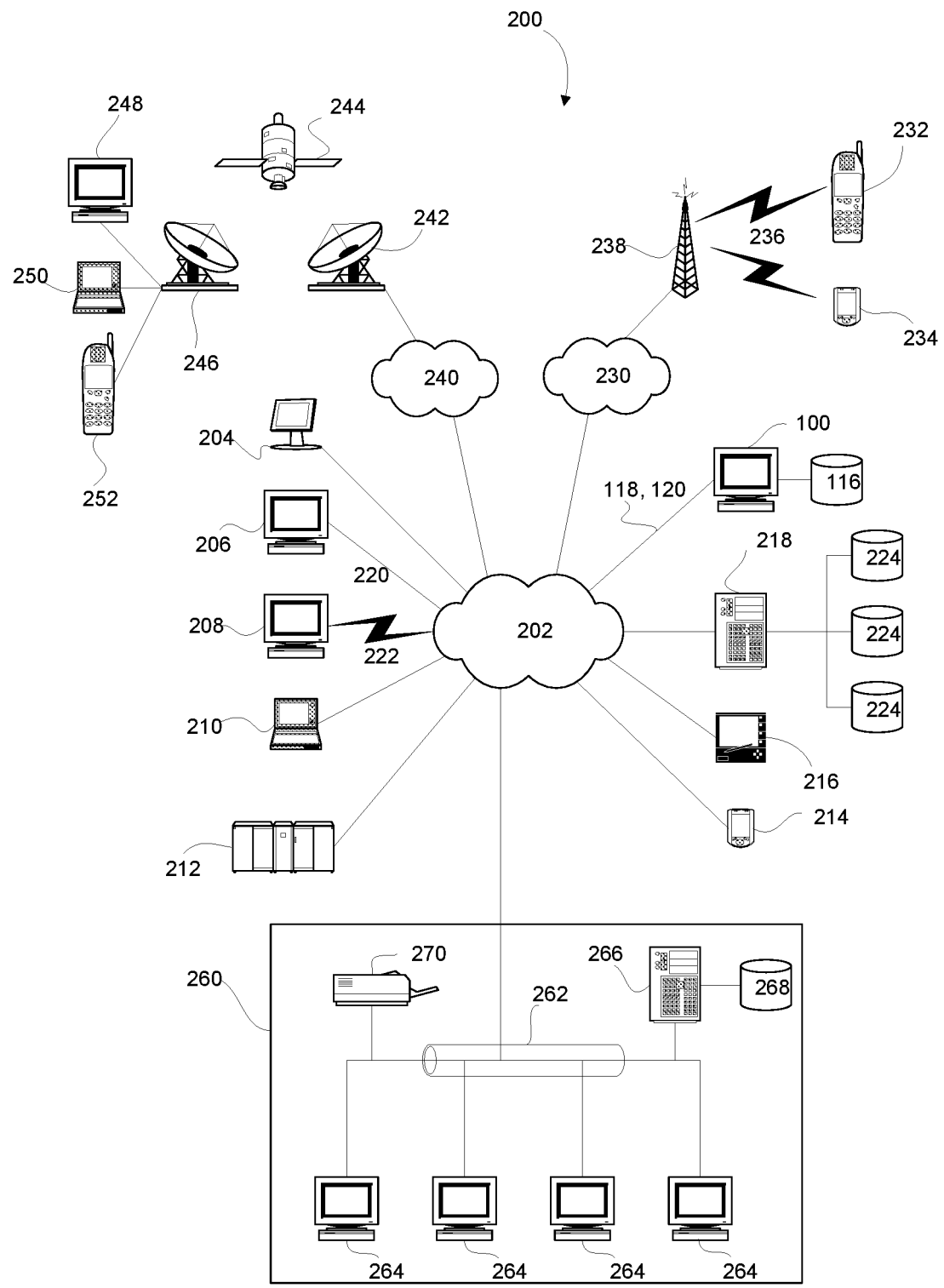
FIG. 2 illustrates an example network infrastructure that can be utilized to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilized. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilizing wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250, or satellite telephone 252, can thereby communicate with network 202. A local network 260, which for example may be a private network, LAN, etc., may also be connected to network 202. For example, network 202 could be connected with ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA, 3G, 4G, etc., networks, and may be wholly or partially wired, including for example optical fibre, or wireless networks, depending on a particular implementation.

EXAMPLE EMBODIMENTS

Figure 3:
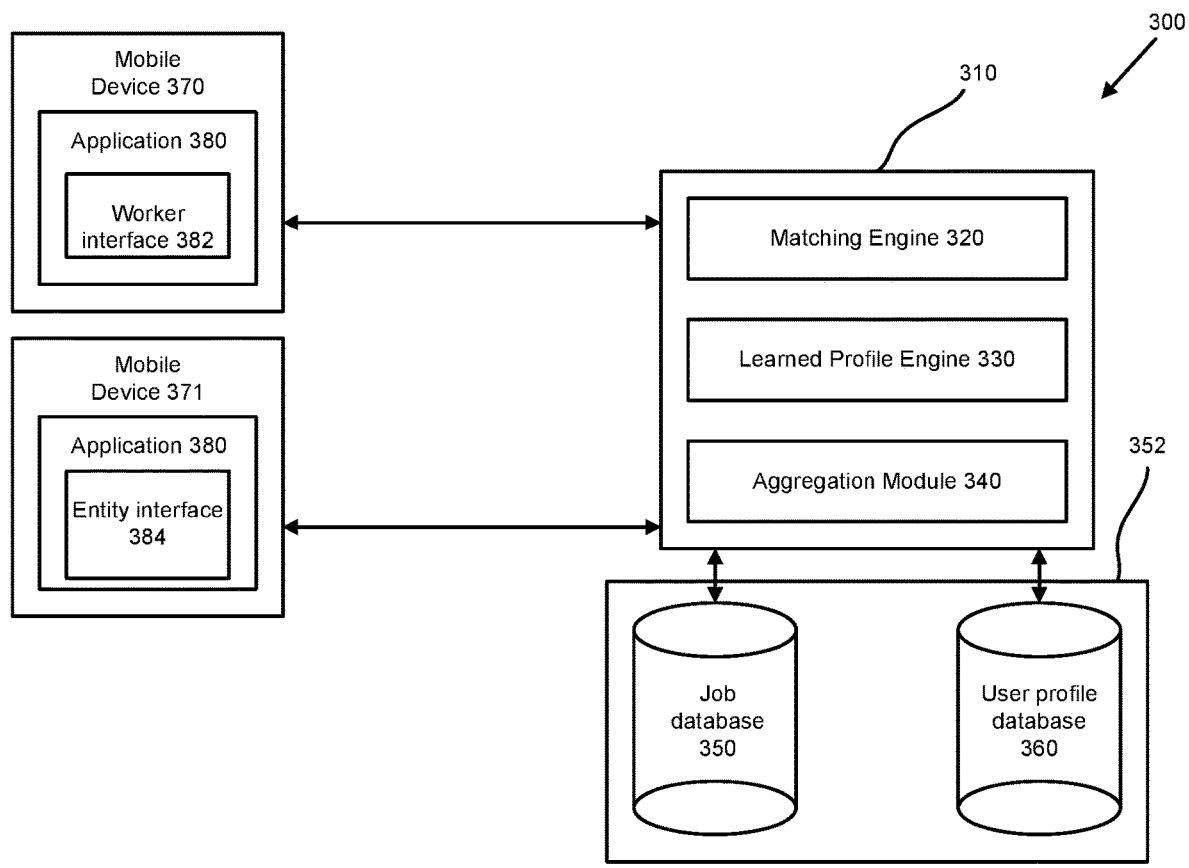
FIG. 3 illustrates a block diagram representing an example system for enabling matching of jobs with workers.

Referring to FIG. 3, there is illustrated a system diagram of a system 300 for matching workers to entities which define jobs. In particular, the system 300 includes a server processing system 310 in data communication with a first and second mobile device 370, 371, preferably smart phones, or tablet processing systems, etc., via a one or more communication networks. The first mobile device 370 is operated by a worker and the second mobile device 371 is operated by an entity. It will be appreciated that the system 310 can include a plurality of first and second mobile devices 370, 371 operated by a respective plurality of workers and entities. The server processing system 310 is able to access or include a data store 352 including a user profile database 360 and a job database 350. It will be appreciated that user profile database 360 and job database 350 can be hosted by the server processing system 310; however it is equally possible that the user profile database 360 and the job database 350 are hosted by other database serving processing systems. Processing system 100 is suitable for operation as the server processing system 310. The server processing system 310 includes a matching engine 320, a learned profile engine 330, and an aggregation module 340 which will be discussed in more detail in various examples below.

The mobile devices 370, 371 include a processor, a memory, an input and output device preferably provided in the form of a touch screen interface, and a communication device. Preferably, the mobile device 370, 371 includes a location receiver (such as a Global Positioning System location receiver) 375. Preferably the mobile devices 370, 371 have stored in the memory a mobile device application 380 which can be downloaded by the mobile devices 370, 371 from a software repository processing system. The user can register with the server processing system 310 as a worker or an entity. In the event that the user registers as a worker, a worker interface 382 will be presented via the mobile application 380 via their respective mobile device 370. In the event that the user registers as an entity, an entity interface 384 will be presented via the mobile application 380 via their respective mobile device 371. However, it will be appreciated that two separate mobile applications could be provided for the two different types of users in alternate arrangements.

Figure 4A:
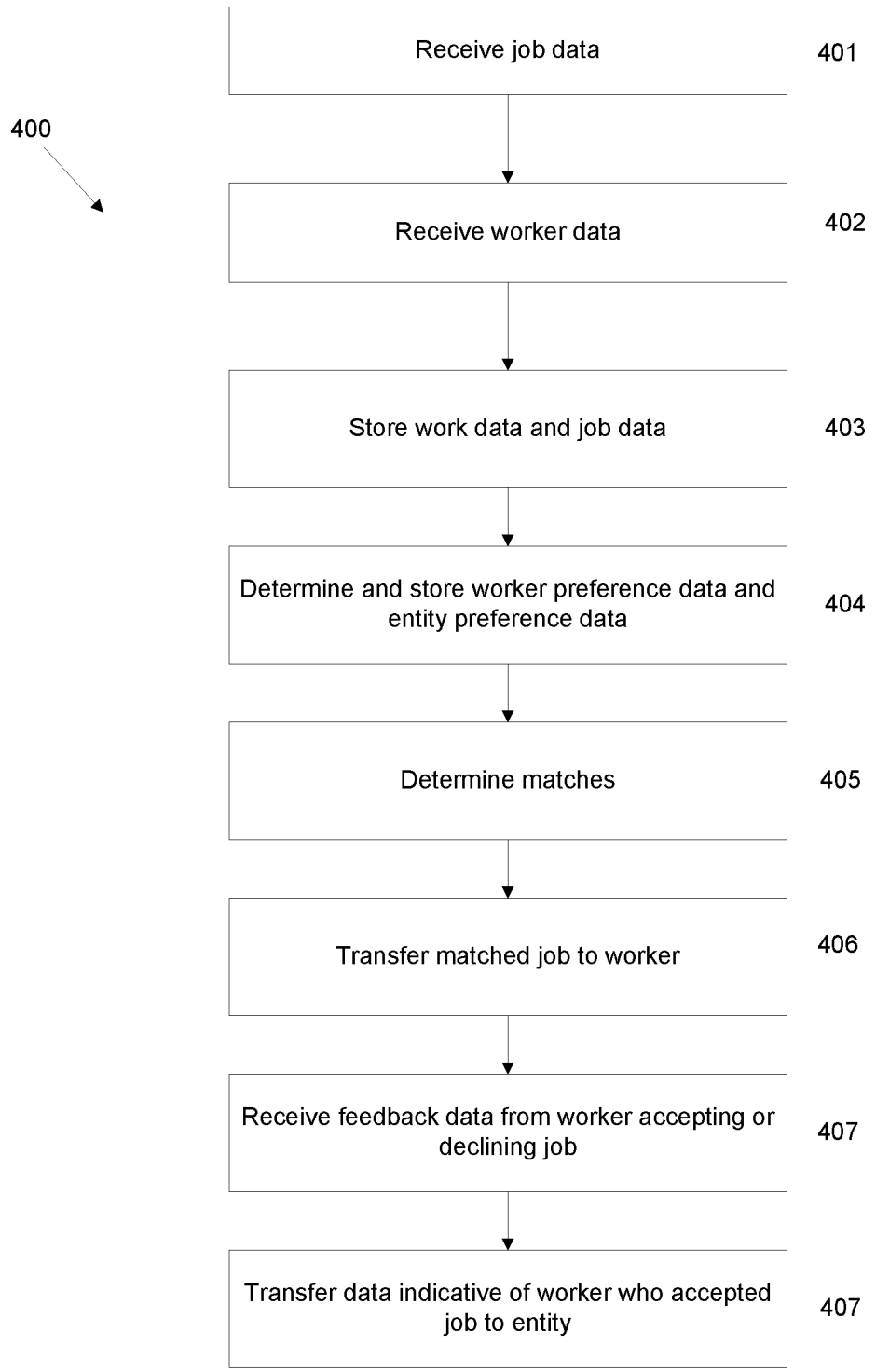
FIG. 4A illustrates a flowchart representing an example method of matching jobs by entities with workers.

Referring to FIG. 4A there is shown a flowchart that represents an example method 400 performed by the server processing system 310 for matching available jobs to workers.

In particular, at step 401 the method 400 includes the server processing system 310 receiving job data indicative of available jobs associated with one or more entities, wherein the job data includes entity requirements for the available jobs.

At step 402, the method includes receiving, at the server processing system 310 worker data indicative of a plurality of workers, wherein the worker data is indicative of at least one of one or more skills, experience, and one or more certifications of each worker.

At step 403, the method includes storing the job data and the worker data in a data store.

At step 404, the method includes determining and storing, in the data store, entity preference data and worker preference data.

At step 405, the method includes determining matches by the server processing system 310, wherein each match dynamically pairs the worker with jobs based on the worker data, the worker preference data, the entity requirements and the entity preference data.

At step 406, the method includes transferring, from the server processing system 310 to each matched worker via a respective mobile device, data indicative of the respective matched jobs.

At step 407, the method includes receiving, by the server processing system 310 from at least some of the mobile devices, feedback data indicative of whether at least some of the matched jobs were accepted or declined.

At step 408, the method includes transferring, from the server processing system 310 to the respective entity for each accepted job, data indicative of the respective worker who accepted the job.

Preferably, the server processing system 310 is configured to update, in real time, the matches in response to receiving the feedback data. In one form, the server processing system 310 updates the worker preference data based on the feedback data. Preferably, the server processing system 310 operates in response to receiving some form feedback received. Thus, the server 310 can be continually refining preferences for various users based on the feedback received in real time and continually determining new matches in real time based on the received feedback. Matching can be performing using distributed event based reprocessing. The updated matches can then be transferred, from the server processing system 310 in real time, to the respective worker mobile devices. For example a worker may be viewing a match on their mobile device but due to the server processing system 310 updating matches for the worker based on a change determined by the server processing system 310, a new more preferable match is transferred and presented to the user in real time such that the previous match is no longer presented by the mobile device to the worker. As such, the matched job can change in real time whilst the user is viewing and operating the mobile application.

It is preferable that the server processing system 310 determines a portion of the workers and a portion of the entities that the feedback directly and indirectly effects such that the server processing system 310 only determines new matches for these subsets of the workers and entities. This thereby increases the speed of the system operating in real time by avoiding having to recalculate all matches for all workers and all entities.

In certain embodiments, the server processing system 310 determines a predetermined number of matches for at least some of the workers. For example, the job card stack which is generated and transferred to each worker mobile device can include three job cards. Each worker mobile device can be pushed a notification, which may be scheduled or in response to a change, indicative of a job card stack waiting for their review. The worker can then interact with the mobile application to progress through the job card stack to determine whether he/she wishes to accept or decline certain jobs. Gesture data based on the respective worker's interaction with an input device (e.g. touch screen) of the mobile device can be captured and provided as feedback data to the server processing system 310 for determining and refining worker preferences. The gesture data can include a swiping action which swipes a job card from the job card stack in a particular direction to indicate whether the worker accepts or declines the job. For example, a first swiping gesture in a first direction in relation to one of the job cards to indicate acceptance of the respective job. Furthermore, a second swiping gesture in a second direction opposite and parallel to the first direction in relation to one of the job cards can indicate declination of the respective job.

The worker data for each worker can be indicative of various information such as temporal availability. For example, a respective worker may indicate that they are available to work between 9 am to 5 pm on Monday through to Friday. The entity requirements of each job can include temporal job requirements. For example, an entity may define a job which requires that the worker attend the location of the job on Tuesday between 9 am to 5 pm. The server processing system 310 can be configured to determine the matches further based on the matching of worker temporal availability and the temporal job requirements. An example temporal interface of the worker interface is presented in FIG. 7E which enables the worker to define their availability which is transferred to the server processing system 310 for storage in the database.

The worker data for each worker can include one or more selected industries which the worker is willing to accept a job within. Furthermore, the worker data can include one or more qualifications of the respective worker. Furthermore, the worker data can include a preferred job location and a match radius of the worker. As will be appreciated, the worker data is generally facts about the respective worker and thus only change over time in the event some fact regarding the worker has changed. The worker data can include at least one of one or more selected industries which the worker is willing to accept a job within, a match radius based on a preferred job location, availability for work, and methods of transport available to the worker, work history, a worker rating, a worker satisfaction rating, and social media habits of the worker.

The server processing system 310 can be configured to receive rating data for at least some of the workers who have completed one of the jobs. The server processing system 310 can be configured to update, in real time, the matches in response to receiving the rating data and then transfer data to one or more mobile devices in response to an updated match. For example, a worker may be rated five out of five for a job which they recently completed with an entity. The server processing system 310 can be configured to update the rating of the worker which may include determining an average of previously received ratings. Due to the high rating received, the worker's rating increases. As there will be entities that have entity preference data indicative of highly rated workers being important, the server processing system 310 is configured to determine updated matches for the respective worker based on the increase in their rating. As such, the server processing system 310 is configured to transfer job matches to workers which attempt to optimally satisfy both the worker and entity preferences.

The worker preference data for each worker can be indicative of a distance which the respective worker is willing to travel. Initially, the server processing system 310 can be configured to receive from a respective worker a nominated distance or time which he/she is willing to travel to accept a job. However, over time, the server processing system 310 refines the nominated distance or time to travel based on feedback data. For example, the worker may interact with the mobile application to nominate that they are willing to travel for one hour in order to accept a job but over time based on feedback data the server processing system 310 determines that a significant amount of matched jobs transferred to the worker having a travel time of greater than thirty minutes are declined. As such, over time certain particulars of the worker preference data which are input by the worker may be refined over time based on feedback.

When a job is accepted by a worker, a reminder notification may be presented via the mobile application shortly prior to the job starting. In one form, the reminder notification may be presented a predetermined time prior to the start of the job. For example, a notification may be presented one hour prior to the job starting. The notification may be generated and transferred by the server processing system 310 to the mobile device of the worker. Alternatively, the mobile application may configure the mobile device of the respective worker to generate and present the notification at the appropriate predetermined time.

In some embodiments, an accepted job by a worker can be cancelled by the respective worker such that the accepted job again becomes available for matching with other available workers again. Therefore, in response to receiving a cancellation of an accepted job, the server processing system 310 updates, in real time, the matches in response to receiving the cancellation and then transfers data to the relevant worker's via their mobile device indicative of the new match that has become available due to the cancellation. In response to receiving the cancellation, the entity associated with the job is notified of the cancellation preferably by the server processing system 310 via their respective mobile device or processing system.

Each worker can interact with the application in order to indicate a satisfaction rating associated with a completed job. The server processing system 310 can update the worker preference data according to the satisfaction rating. For example, if a worker indicates that their satisfaction rating for a completed job was one out of five, then the worker preference data can be updated to reflect certain preferences that can be inferred by the server processing system 310 based on this feedback from the respective worker. Thus, over time the matched jobs that are presented to the worker result in a higher satisfaction for the worker. In some instances, entities may also be rated based on the satisfaction rating provided by the worker. Thus, in the event that a job consistently receives a less than satisfactory rating, the respective job may presented to workers who are willing to perform less than satisfactory jobs for some other benefit, such as higher pay, or to workers who are less preferred by entities.

At least some of the worker mobile devices can include a location receiver. Directions to a location of an accepted job can be determined and presented within the mobile application based upon a current location determined by the location receiver. A mapping server processing system may be transferred a query based on the current location and the location of the job, wherein the mapping server processing system transfers to the mobile device direction data indicative of a route to the job location.

In certain instances, an entity may wish to offer a job to one or more workers of the system. For example, a nominated or "favorited" worker may have completed a job for the entity before who was rated highly by the entity. In these situations, the entity can transfer data indicative of one or more nominated workers to the server processing system 310, such that the server processing system 310 generates a job card stack including the job card indicative of the job associated with the entity. Thus, this process ensures that the worker is presented the job card to decide whether he or she wishes to accept the job. The job card that is presented to the worker may include a visual indication that the worker was nominated by the entity for the job such that the worker may take this into account as to whether they wish to accept or decline the respective job.

Figure 4B:
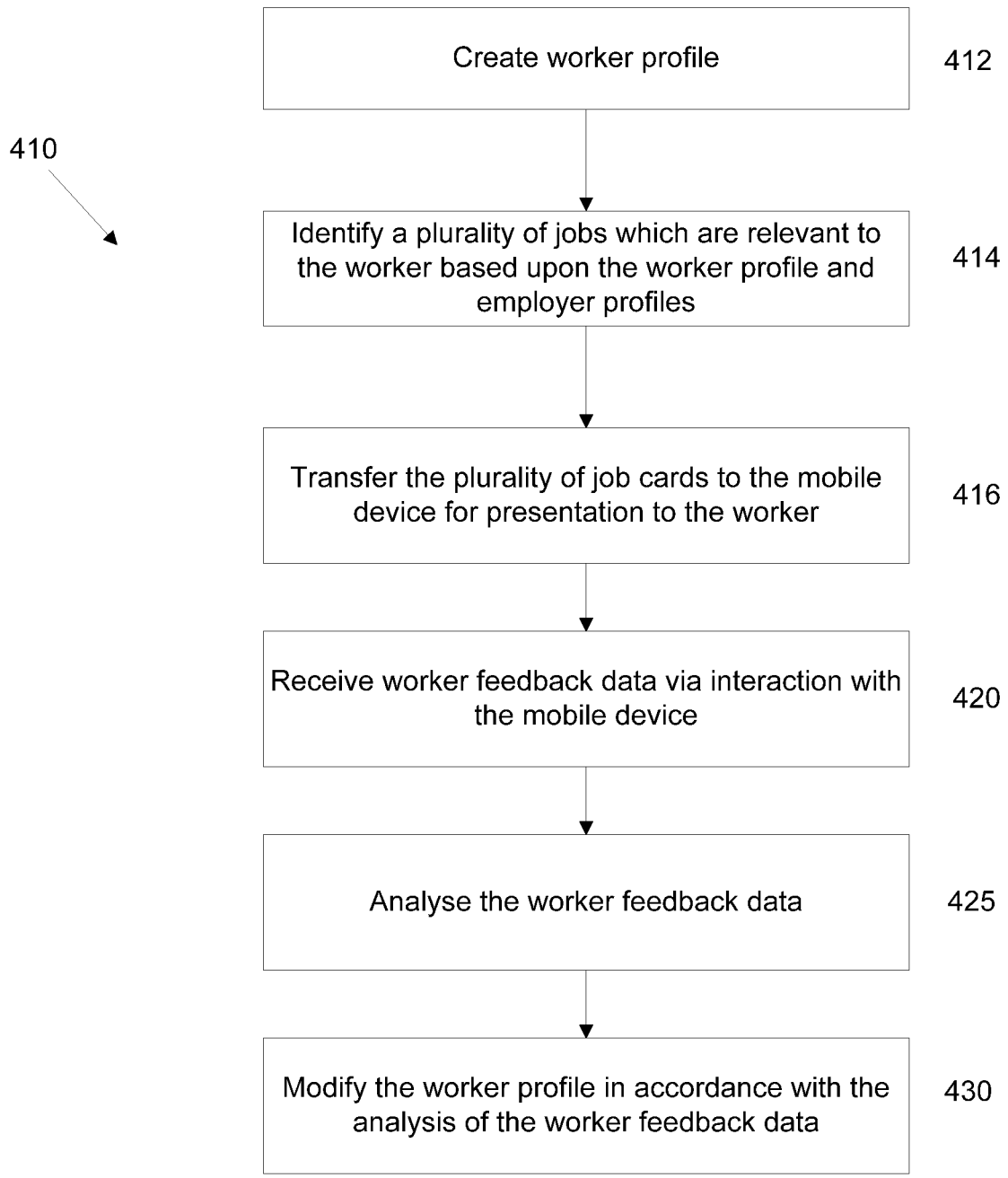
FIG. 4B illustrates a flowchart representing an example method performed by a server processing system for serving jobs to a mobile device for viewing by a worker.

Referring to FIG. 4B there is shown a flowchart that represents an example method 400 performed by the server processing system 310 in relation to a worker.

In particular, at step 412 the method 410 includes the server processing system 310 creating a worker profile record indicative of a worker profile that is stored in the user profile database 360 of the data store 352. At step 414 the method 410 includes the server processing system 310 identifying a plurality of jobs that match the worker based upon the worker preferences stored as part of the worker profile stored in the data store 352. At step 416, the method 400 includes the server processing system 310 transferring a plurality of job cards to the mobile application 380 for presentation to the worker as a job card stack. At step 420, the method 400 includes the server processing system 310 receiving worker feedback data indicative of whether each job was accepted or declined based on the worker interaction with the mobile device 370 during progression through the job card stack interface. At step 425, the method 400 includes the server processing system 310 analyzing the worker feedback data. At step 430, the method 400 includes the server processing system 310 updating the worker profile in accordance with the analysis of the worker feedback data 670 such that future job cards which are presented to the worker are identified in accordance with the updated worker profile indicative of the worker preferences.

Figure 4C:
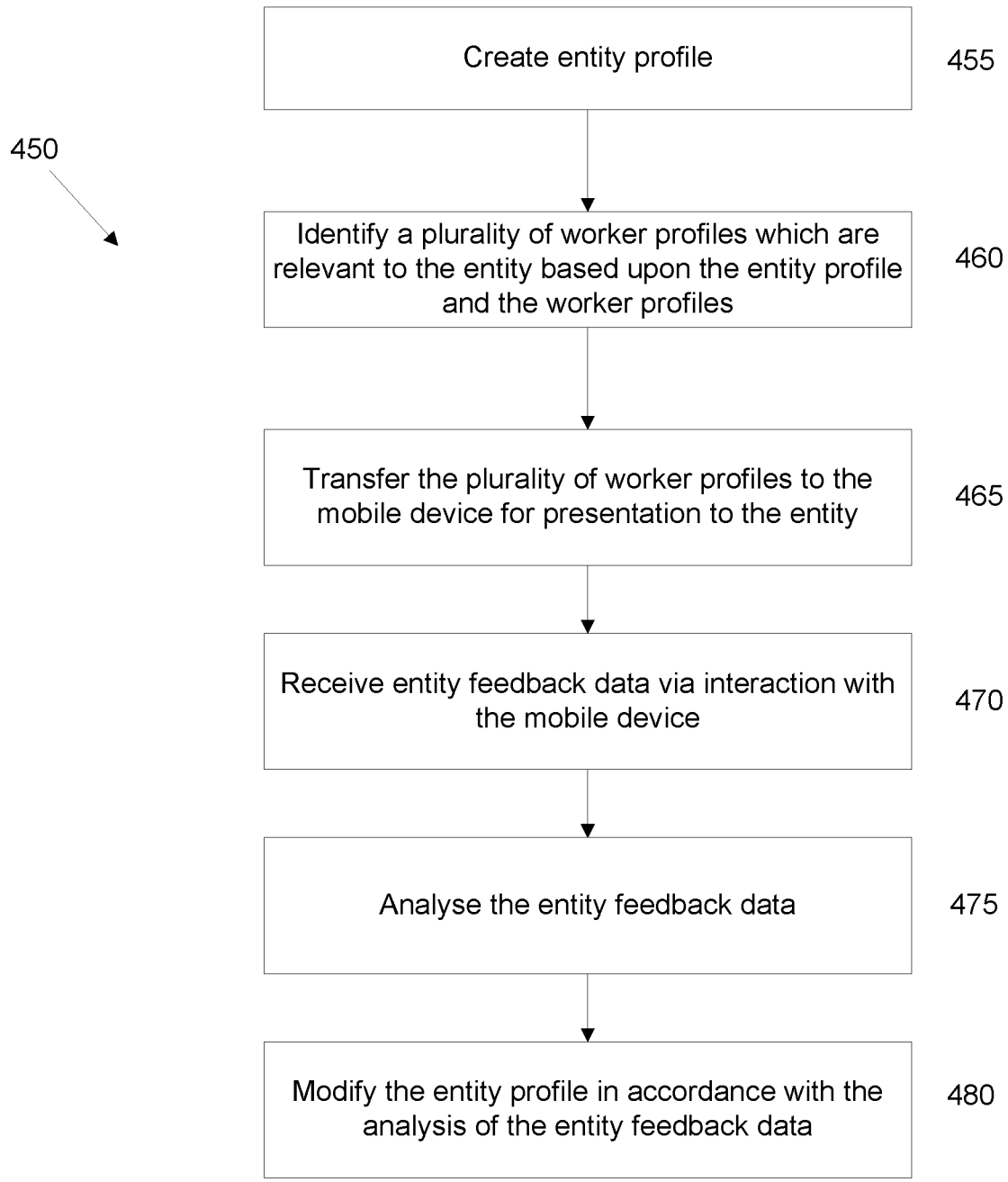
FIG. 4C illustrates a flowchart representing an example method performed by a server processing system for serving worker cards to a mobile device for browsing by an entity.

Referring to FIG. 4C there is shown a flowchart that represents an example method 450 performed by the server processing system 310 in relation to an entity.

In particular, at step 455 the method 450 includes the server processing system 310 creating an entity profile that is stored in the user profile database 360 of the data store. At step 460 the method 450 includes the server processing system 310 identifying a plurality of workers from the worker profile records stored in the user profile database 360 which match the entity's job based upon the entity profile and the worker profile. At step 465, the method 450 includes the server processing system 310 transferring data indicative of the identified workers to the mobile application 380 for presentation to the entity as a worker card stack interface. At step 470, the method 450 includes the server processing system 310 receiving entity feedback data indicative of whether each worker was or was not offered a job by the entity via user interaction with the mobile device 371 during progression through the worker card stack interface. At step 475, the method 450 includes the server processing system 310 analyzing the entity feedback data. At step 480, the method 400 includes the server processing system 310 updating the entity profile in accordance with the analysis of the entity feedback data such that future worker profiles presented to the entity are identified in accordance with the updated entity profile.

Figure 5A:
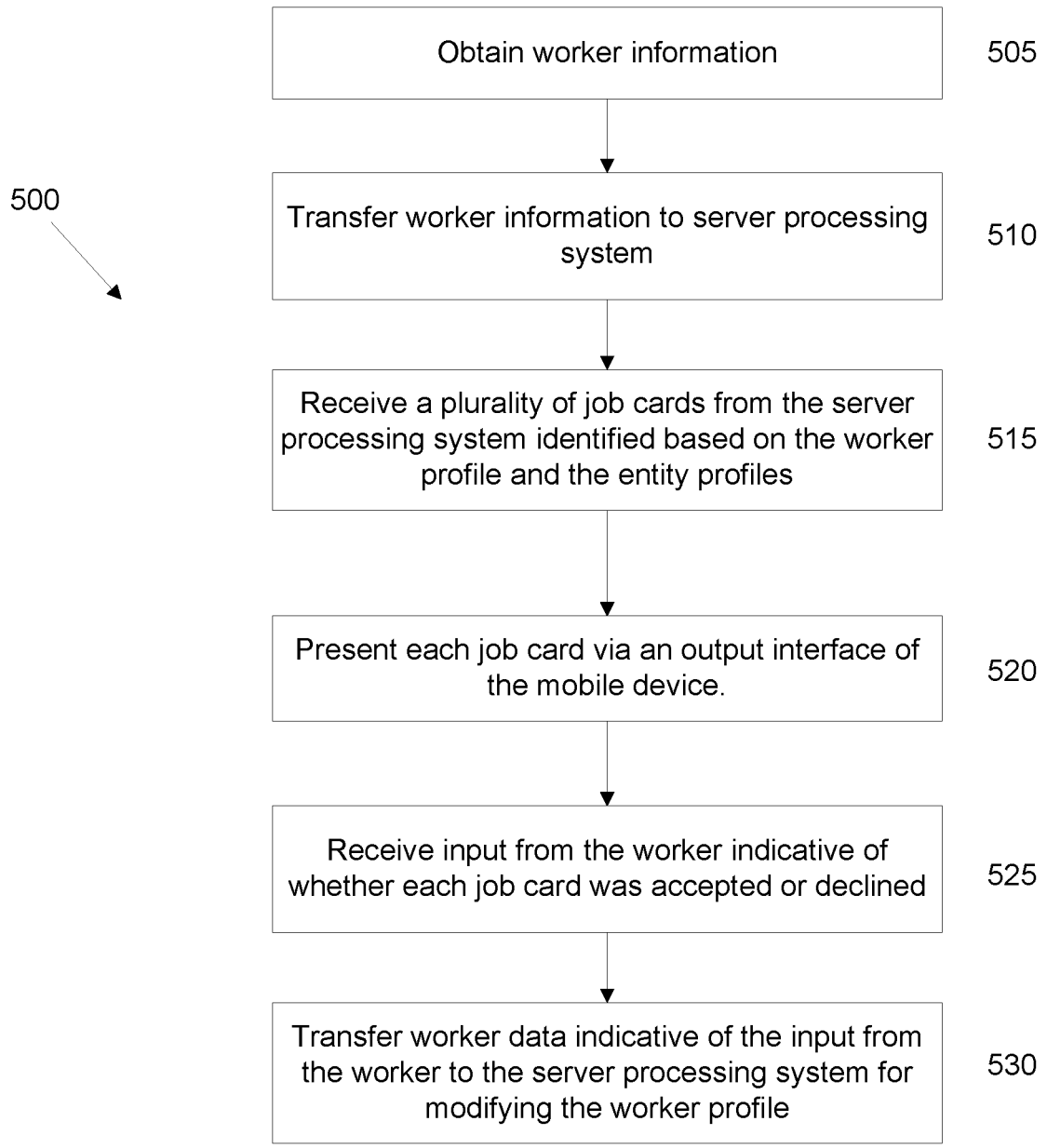
FIG. 5A illustrates a flowchart representing an example method performed by a mobile device for presenting matched job card to a worker.

Referring to FIG. 5A there is shown a flowchart representing a method 500 performed by the mobile device 370 for a worker.

In particular, at step 505, the method 500 includes the mobile device 370 obtaining worker information from the worker. In one form, one or more electronic forms may be presented via the mobile application which are completed by the worker. In some embodiments, the server processing system 310 can also obtain worker information based on online social media content from an online social network and a location of the mobile device indicated by the location receiver. At 510, the method 500 includes transferring the obtained data to the server processing system 310 for storage and analysis to enable the generation of the worker profile. At step 515, the method 500 includes the mobile device 370 receiving data indicative of a plurality of job cards from the server processing system 310, wherein the plurality of job cards are identified as a match between the worker preferences defined in the worker profile and entity preferences of the one or more entity profiles. At step 520, the method 500 includes the mobile device 370 presenting a job card stack interface of the job cards via an output interface of the mobile device 370. At step 525, the method 500 includes receiving input from the worker interacting with an input interface of the mobile device 370, wherein the input is indicative of whether the job of each job card was accepted or declined by the worker whilst simultaneously progressing through the stack interface. More specifically, upon being presented with a particular job card from the job card stack interface, the worker can interact with the graphical user interface by making a swiping gesture on the touch screen of the mobile device 370 to indicate whether the job classified was accepted or decline by the worker. For example, the worker can indicate a particular job as being declined by using a swiping gesture in a left direction wherein the job card is deleted from the stack, and the worker indicates a particular job as being by using a swiping gesture in a right direction. At step 530, the method 500 includes transferring worker feedback data indicative of the input from the worker to the server processing system 310 for updating the worker profile such that future job cards received from the server processing system 310 are based on the updated worker profile.

Figure 5B:
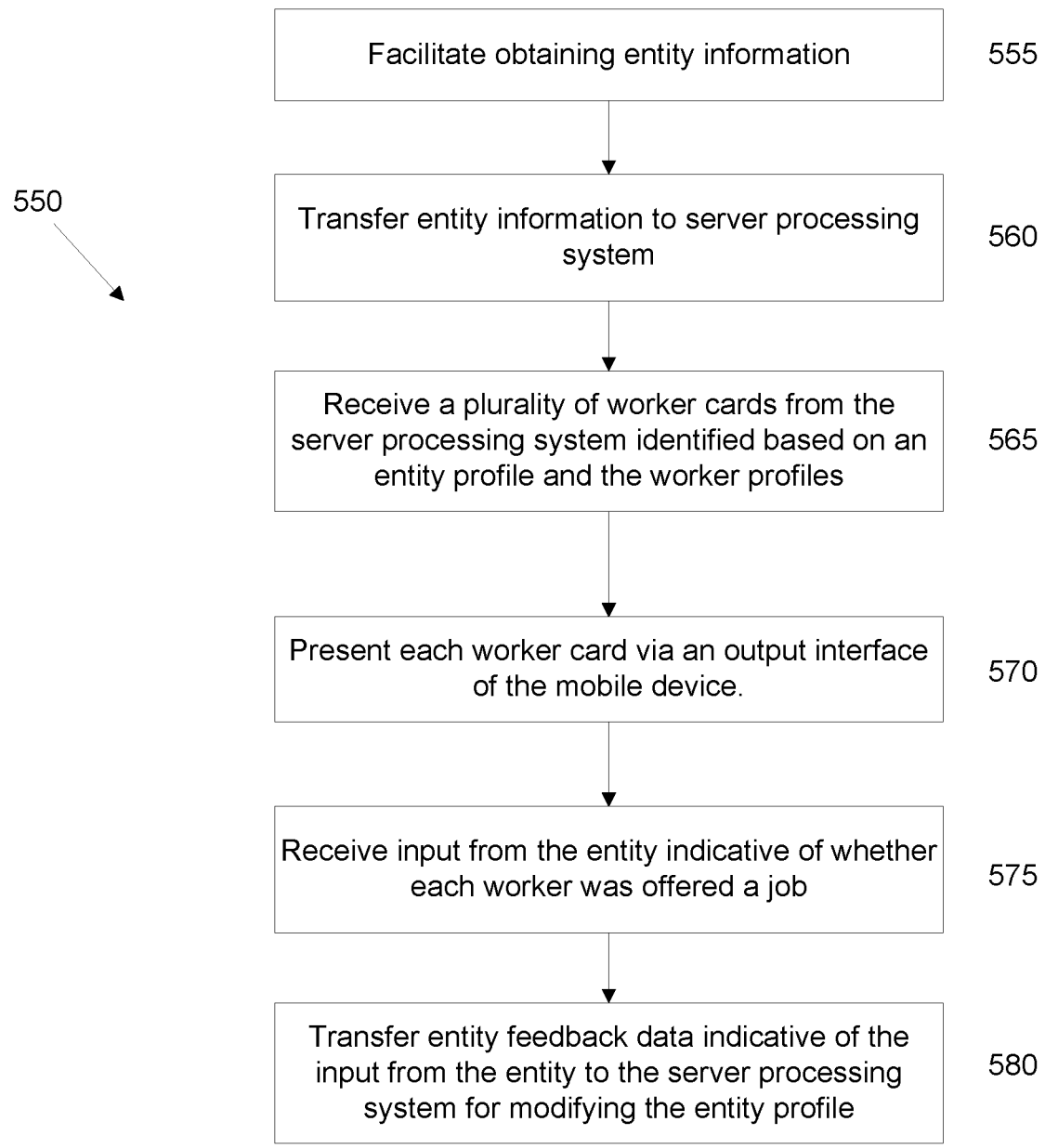
FIG. 5B illustrates a flowchart representing an example method performed by a mobile device for presenting worker card to an entity.

Referring to FIG. 5B there is shown a flowchart representing a method 550 performed by the mobile device 371 for an entity.

In particular, at step 555, the method 550 includes the mobile device 371 obtaining entity information from the entity. In one form, the entity may be a customer of the employer of the workers, wherein the customer provides customer information. Alternatively, the entity may be a potential employer wishing to employ a worker, wherein the potential employer provides employer information. Additionally, entity information may be obtained from online social media content, an online social network of the entity, and a location of the mobile device 371. At 560, the method 550 includes submitting data of entity to the server processing system 310 for storage and analysis to enable the generation of the entity profile. At step 565, the method 550 includes the mobile device 371 receiving data indicative of a plurality of worker cards from the server processing system 310, wherein the plurality of worker cards are identified based on the entity profile. At step 570, the method 550 includes the mobile device 371 presenting a stack interface of the worker cards via an output interface of the mobile device 371. At step 575, the method 550 includes receiving input from the entity interacting with an input interface of the mobile device 371, wherein the input is indicative of whether each worker was offered or not offered a job by the entity whilst simultaneously progressing through the worker card stack interface. More specifically, upon being presented with a particular worker profile from the stack interface, the entity can interact with the graphical user interface by making a swiping gesture on the touch screen of the mobile device 371 to indicate whether the worker was offered a job or not. For example, the entity can indicate a particular worker is not offered a job by using a swiping gesture in a left direction wherein the worker card is deleted from the stack, and the entity indicates a particular worker is offered a job by using a swiping gesture in a right direction wherein the server processing system 310 generates a job card stack including the offered job from the respective entity. At step 580, the method 550 includes transferring entity feedback data indicative of the input from the entity to the server processing system 310 for updating the entity profile such that future worker cards received from the server processing system 310 are based on the updated entity profile.

Figure 6A:
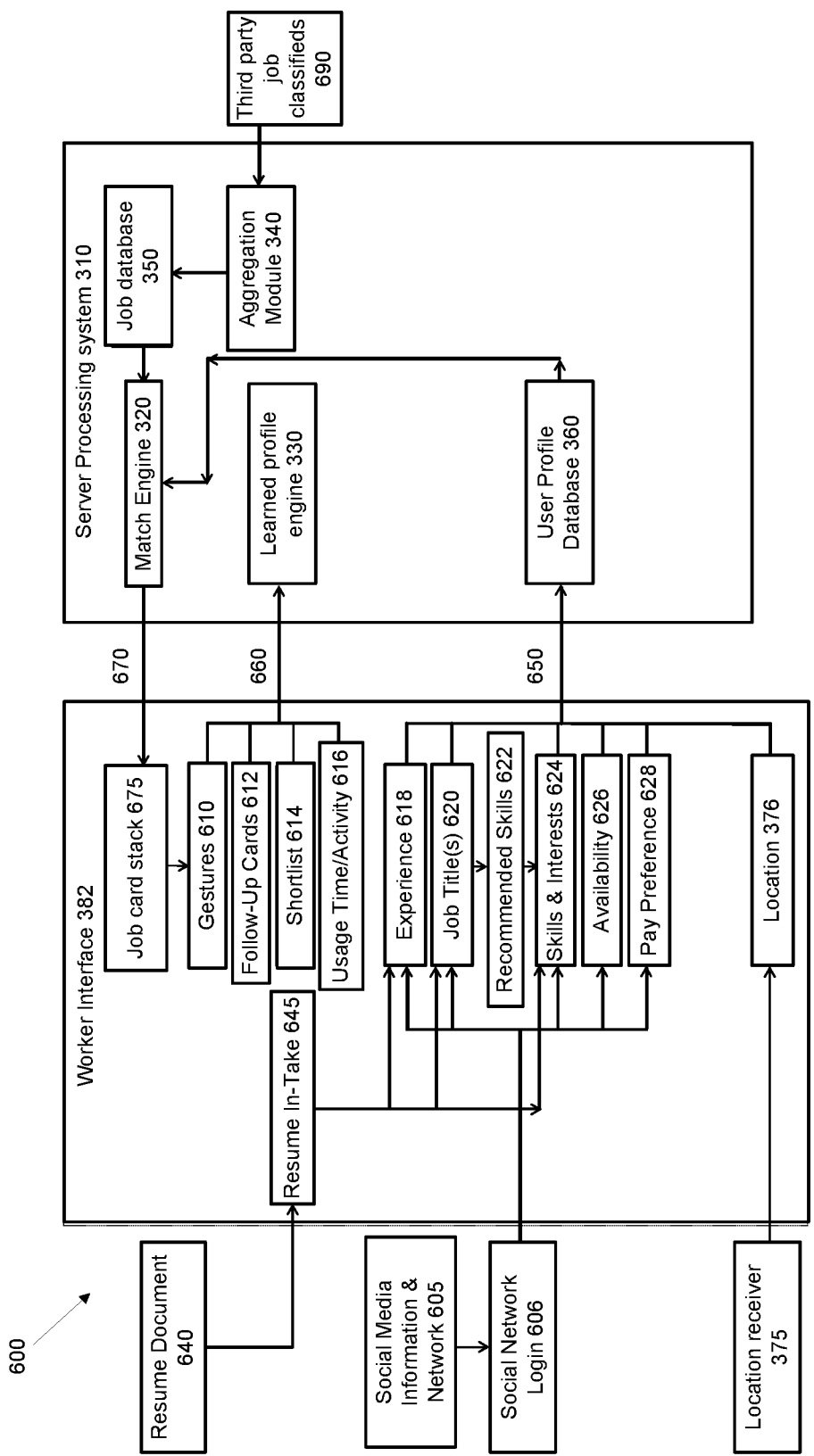
FIG. 6A illustrates system diagram representing a portion of the system for presented matched jobs to a worker.

Referring to FIG. 6A, there is illustrated a more detailed system diagram of a portion of the system for enabling a worker to browse job cards via the worker interface 382 of the mobile application 380.

In particular, a worker can login to the system 600 using login credentials 606 for a social network account 605 or login details specifically defined for the system. An entity can login to the system using login details defined by the system 600, their personal social network account, or a social network account of the job providing organization.

Various data sources can be used by the server processing system 310 (FIG. 3) to create the initial worker profile stored in the user profile database 360 prior to receiving feedback data 660 from the mobile device. In particular, data associated with an online social network account 605, which is hosted by a social network processing system, can be extracted by the mobile application 380 of the mobile device 370 or the server processing system 310 to populate one or more profile properties of the respective user profile. For example, in relation to an online corporate or non-corporate social network, career related data such as the worker's experience 618, job title(s) 620, industry, skills and interests 624, availability 626, pay preference 628 and/or existing connections (e.g. employment of connections in corporate or non-corporate social network of the user) can be obtained or inferred by the mobile device 370 or the server processing system 310 from the social network processing system to generate the user's initial user profile. The application 382 may also recommend skills 382 to the worker for confirmation based on the various data extracted above.

Generally, the server processing system 310 presents a request via the mobile device 370 for explicit user permission to access such data from the social network account 605. The server processing system 310 can extract data from the social network account 605 using an API provided by the social network processing system.

In some instances, data accessed from a personal social network 605 may not be considered sufficient by the server processing system 310 to populate a sufficient number of profile properties of the worker profile. In this situation, the server processing system 310 may present a survey via the mobile device 370 for completion by the user. The survey may be presented in the form of a short gamified survey. Results from the survey as well as the other collected information 650 are transferred to the server processing system 310 for use in generating the initial user profile which is stored in the user profile database 360. Further short gamified surveys can be triggered from time to time based on the learned profile and the preferences of entities, or follow-up questions based on user behavior to better define user preferences.

Likewise, to populate a sufficient number of worker profiles, the application 380 may also access externally stored, electronic resume or curriculum vitae (CV) files 640 via a resume in-take module 645 through the appropriate access or via electronic communication, wherein particular profile properties can be defined based on the document 640.

Location data 376 associated with the operation of the mobile device 370 can also be utilized by the server processing system 310 to generate an initial worker profile as well as modifying the user profile over time. In particular, the location data 376 may be generated by the location receiver 375 of the mobile device 370 which is then transferred to the server processing system 310 to generate the initial user profile or modify an existing user profile in the user profile database 360.

Passive data can also be obtained by the server processing system 310 from a carrier entity associated with the mobile device 370 in order for the server processing system 310 to generate an initial worker profile or update an existing worker profile. Such passive data may include user data and location data. Conclusions drawn by the server processing system 310 using the passive data may require the server processing system 310 to request confirmation from the worker of the mobile device 370 prior to uploading one or more profile properties to the worker profile.

The server processing system 310 includes an aggregation module 340 which can aggregate jobs from a number of third party job processing systems 690 which are then modified for presentation via a mobile device 370 and stored in the job database 350.

As previously discussed, the server processing system 310 also includes a matching engine 320 for identifying a plurality jobs from the job database 350 which relevant to worker based upon optimally matching worker preferences and entity preferences.

The server processing system 310 also includes a learned profile engine 330 which receives the feedback data 660 from the user regarding whether each job card from the job card stack 675 was considered accepted or declined based on user input 610. The learned profile engine 330 analyses the feedback data 660 based on the worker's current profile, and then updates the worker profile in the user profile database 360 if required based on the results of the analysis.

Specifically, the learned profile engine 330 can employ a number of techniques to modify the worker profile to thereby supply increasingly relevant job cards based on previous application interactions. In particular, information from gestures 610, follow-up cards 612 (as will be discussed in more detail below), activities within a shortlist 614 of jobs which the worker is attempting to select between, or other passive and active interactions 616) can be used.

In one form, the server processing system 310 can be configured to dynamically use matching factors to produce a sorted order of job cards for the worker to view. As such, the best match is presented first within the stack.

Figure 9:
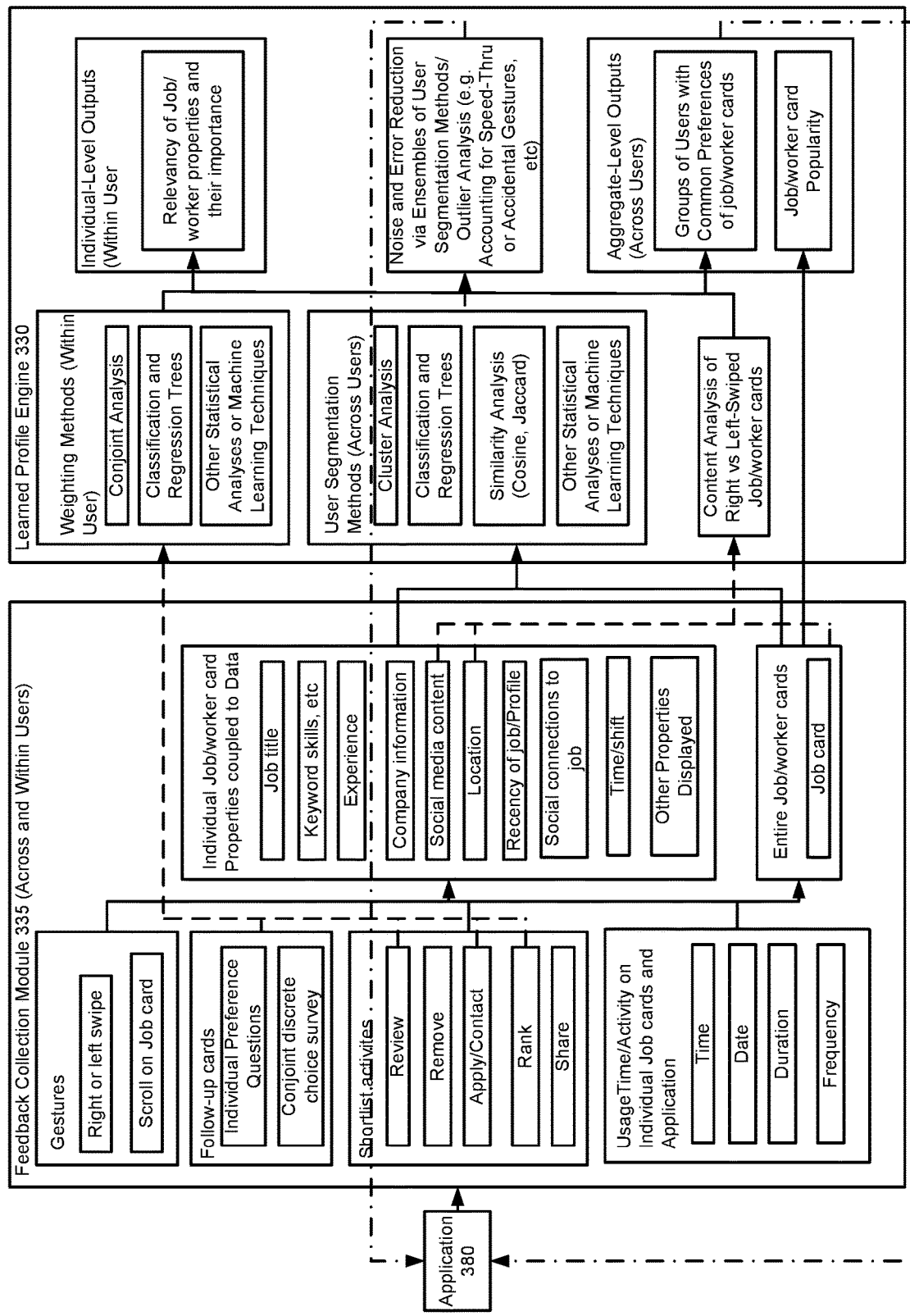
FIG. 9 illustrates a block diagram representing an example combination of analysis techniques performed by the learned profile engine of the server processing system.

Referring to FIG. 9, gestures in the application by the user, functions used within the shortlist, as well as application usage activity can be coupled together. This combined information is analyzed through statistical cluster analysis, classification and regression trees, similarity analyses (Cosine or Jaccard similarity comparisons), or any other related statistical or machine learning techniques to derive segments of users (e.g., those who find particular properties or groups of properties appealing). These analyses can be compared and membership in various groups, which emerge from the data, combined into meaningful preferences leveraged for deriving relevant properties in subsequent job cards and worker profiles. Data aggregated by a feedback collection module 335 of the server processing system 310 can couple gestures, shortlist activities, and usage activity with entire job cards. Feedback collected can include passive and direct feedback. The results of applying these data to the same analyses as above may determine additional segments which might be useful, but also to account for noise and error in the data. Specifically, users may provide accidental gestures or hurry through the job card stack, and such data should be flagged and removed through the results of one of the analysis techniques or combination thereof.

Data collected from follow-up cards (which may include individual preference questions or a conjoint/discrete choice survey) and specific shortlist activities (e.g., accepting a job, contacting an entity, or ranking job cards in the shortlist), can be used to weight various job cards or profile properties. This can be done through the conjoint analysis, classification and regression trees, or other statistical or machine learning techniques.

Text analysis and natural language processing can derive additional properties from job cards and profiles that are relevant to the user. Using input from the job cards and profiles various important combinations of properties can be delineated among the user base. For example, among some workers, the co-occurrence of a specific entity, location, and specific skillset in a job card may be uniquely relevant, above and beyond what would be expected based on the individual preference of its component parts.

In combining these three aspects, weighting, user segmentation, and text analytic methods, useful job matches and profile properties can be delineated and their relative importance determined for each user. This information enables the supply of highly matched job cards with the worker profiles. Consequently, over a number of iterations, the platform is able to provide matches to users that are highly relevant. Outputs are both individual (i.e., within user) and collective (i.e., useful across users) in nature—both informing subsequent job cards/worker profiles presented in the application.

In certain instances, a particular job which the match engine 320 expected to be accepted by the worker may be declined by the worker. In response to the feedback data 660, the server processing system 310 may communicate with the application 380 to present a follow-up card requesting further feedback from the user. In particular, portions of the particular job card can be selected by the worker as being highly desirable or undesirable. In one form, portions of the job card may wobble, wherein the worker can select particular elements (i.e. pay, entity, job title, etc.) of the job card to delete, wherein the further feedback data is transferred back to the server processing system 310 for analysis by the learned profile engine for updating the worker profile.

Figure 6B:
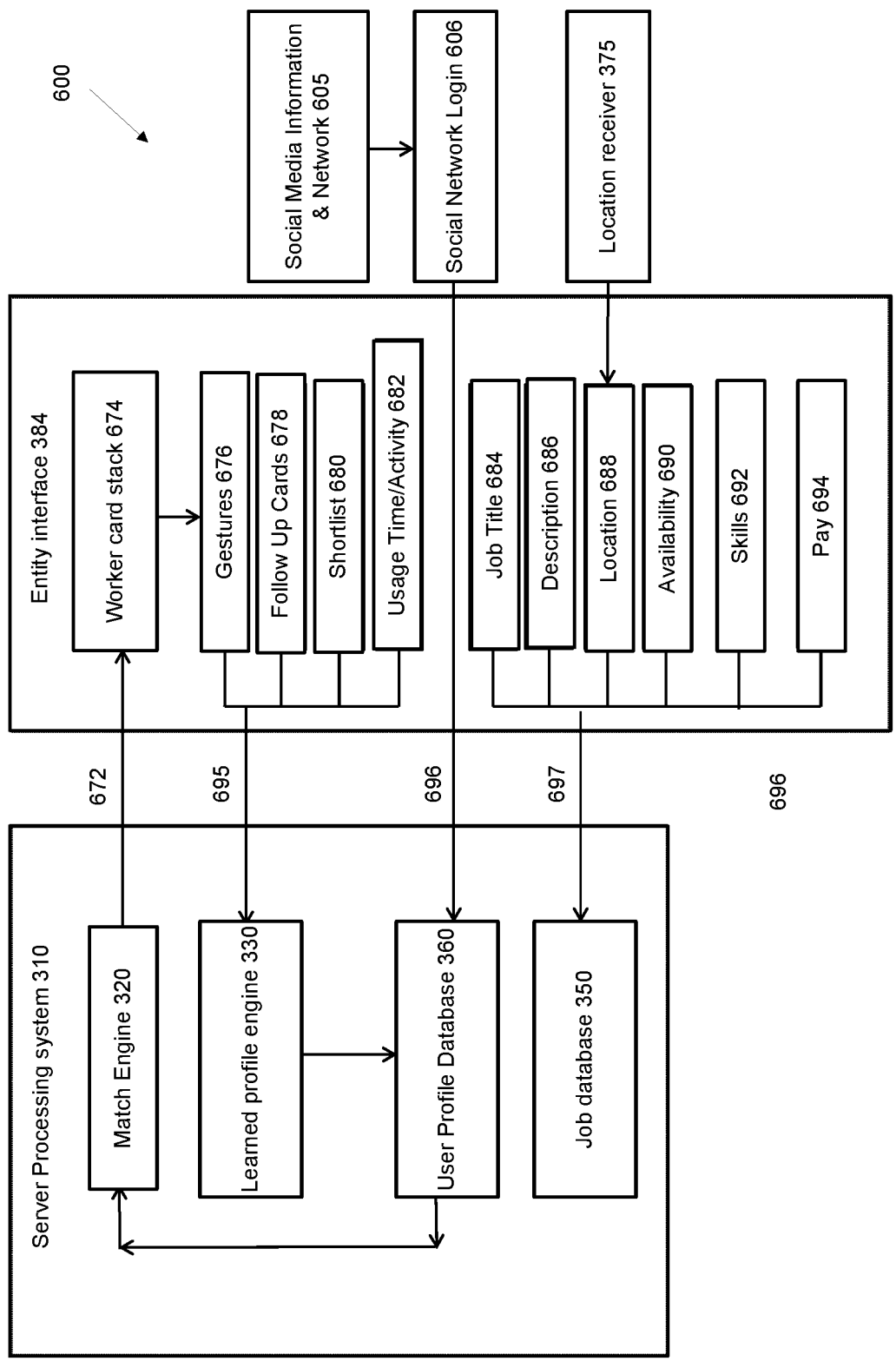
FIG. 6B illustrates system diagram representing a portion of the system for presenting matched workers to an entity.

Referring to FIG. 6B there is shown a more detailed system diagram of a portion of the system for enabling an entity to browse worker cards via the entity interface 384 of the mobile application 380.

The entity interface allows the entity to login to the system using login credentials 606 defined with the system 600 from a social media network 605. An entity profile can be generated by extracting data from the social media account associated with the entity. This can include corporate online social network accounts (e.g. Starbucks' Facebook page or Starbucks' LinkedIn page). The entity interface 384 also enables the entity to submit a job order for storage in the job database 350. In particular, job requirements such as the job title 684, description 686, location 688, availability 690, required skills 692, and pay 694 may be input by the entity to define a job order for storage in the job database 350. In particular arrangements, the location may be determined based upon the location receiver 375 of the mobile device 371. A portion of the required skills that are input may be suggested by the application 380 based upon other data entered such as the job title and description. In particular embodiments, the entity profile may also be defined at least partially based upon the job order that is uploaded into the job database 350.

The match engine 320 identifies a plurality of worker cards 672 from the user profile database 360 based upon the entity profile. The worker card stack 674 is then presented by the entity interface 384 for the user to progress through as discussed above in relation to the job card stack interface 675. Feedback data 695 indicative of gestures 676, follow-up cards 678, ranking of shortlisted worker cards 680 and other passive data 682 (i.e. usage time/activity) is transferred from the mobile device 371 to the server processing system 310 for analysis by the learned profile engine 330. The learned profile engine 330 can perform similar types of analysis to that discussed above to determine whether particular properties of the entity profile can be inferred resulting in modifications to the respective entity profile in the database.

Figure 7A:
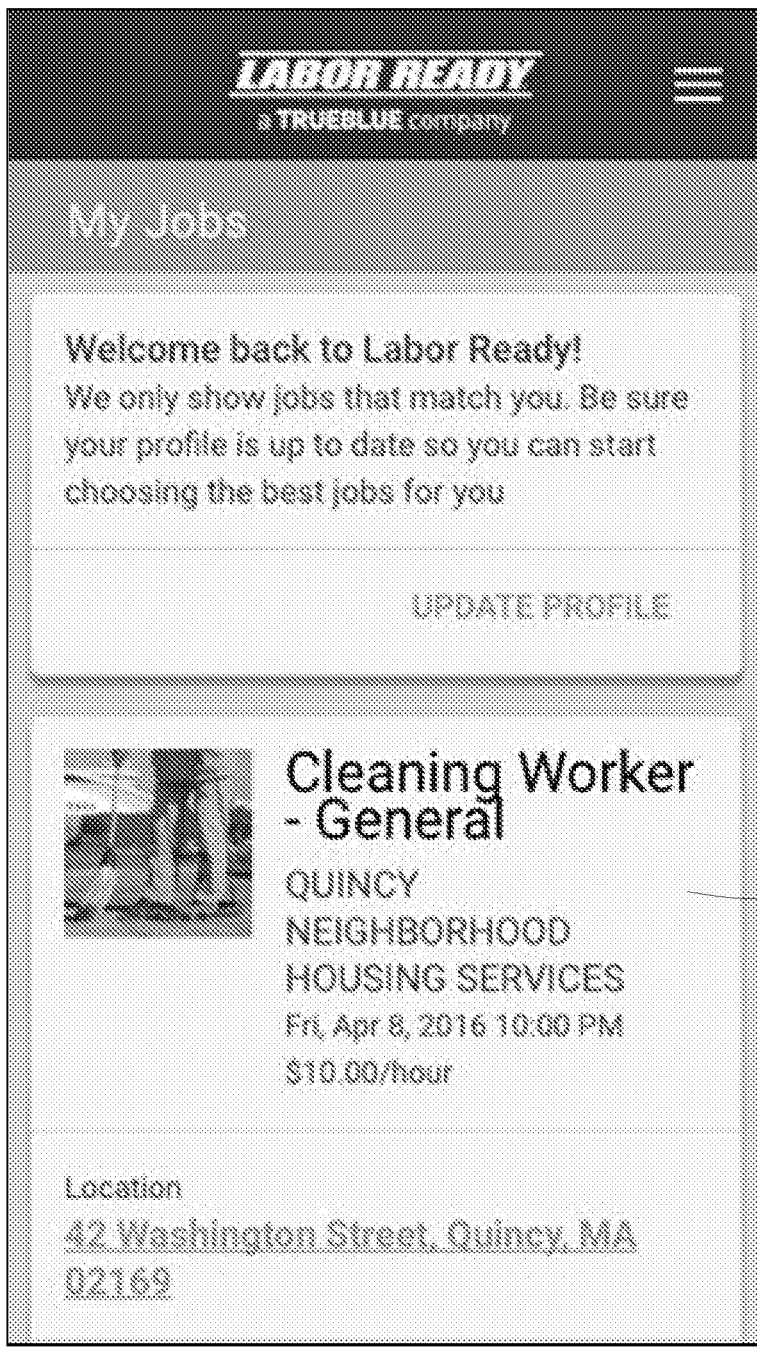
FIGS. 7A to 7E show various example interfaces of the worker interface.

In certain instances, a particular worker which the match engine 320 expected to be offered a job from the entity may not be selected by the entity. In response to the feedback data 695, the server processing system 310 may communicate with the application 380 to present a follow-up card requesting further feedback from the entity. In particular, portions of the particular worker card can be selected by the entity as being highly desirable and/or highly undesirable. In one form, portions of the worker card may undergo a wobble animation, wherein the entity can select particular elements (i.e. experience, skills, etc.) of the worker card to delete, wherein the further feedback data is transferred back to the server processing system 310 for analysis by the learned profile engine 330 for updating the entity profile An example of the worker interface presenting one of the job cards 701 is shown in FIG. 7A. The job card includes details such as the job title, the entity's name, the time and date of the job, a pay rate and a location.

The worker can provide input via the touch screen interface of the mobile device 370. In particular, based on the example interface shown in FIG. 7A, the worker may swipe the job card 701 in a substantially right direction which indicates that the job has been accepted by the worker. The job card can alternatively swipe the job card 701 in a substantially left direction to indicate that the worker has declined the job. The mobile device 370 stores feedback data 660 indicative of the worker input in memory. As the worker performs the swiping gesture when interacting with the touch screen interface, the mobile application 380 visually depicts the job card 701 moving off the worker interface in the direction of the swiping action such that an underlying job card from the job card stack is presented for viewing by the user. Thus, the worker's swiping action simultaneously allows the worker to input whether the job of the job card is accepted or declined whilst additionally requesting that the next job card in the job card stack 675 is presented to the worker.

Figure 7B:
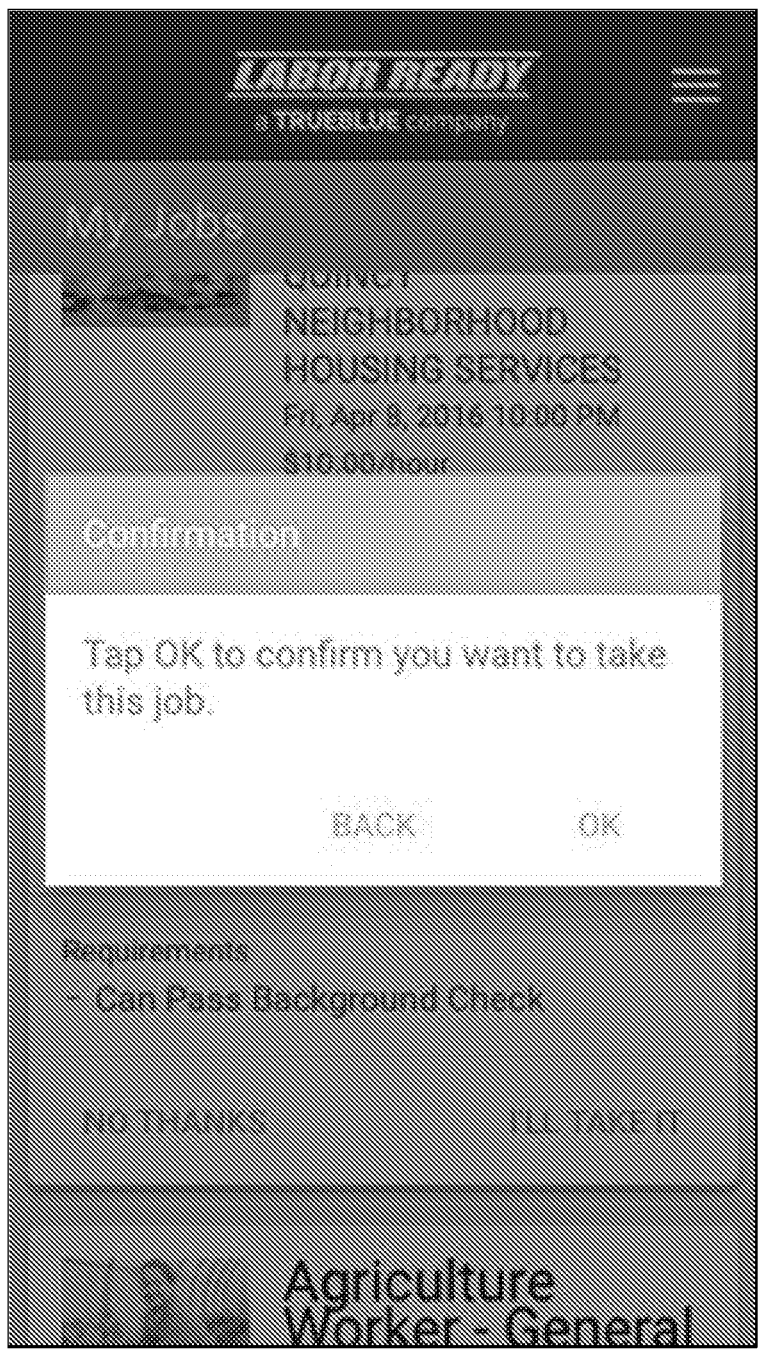
Figure 7C:
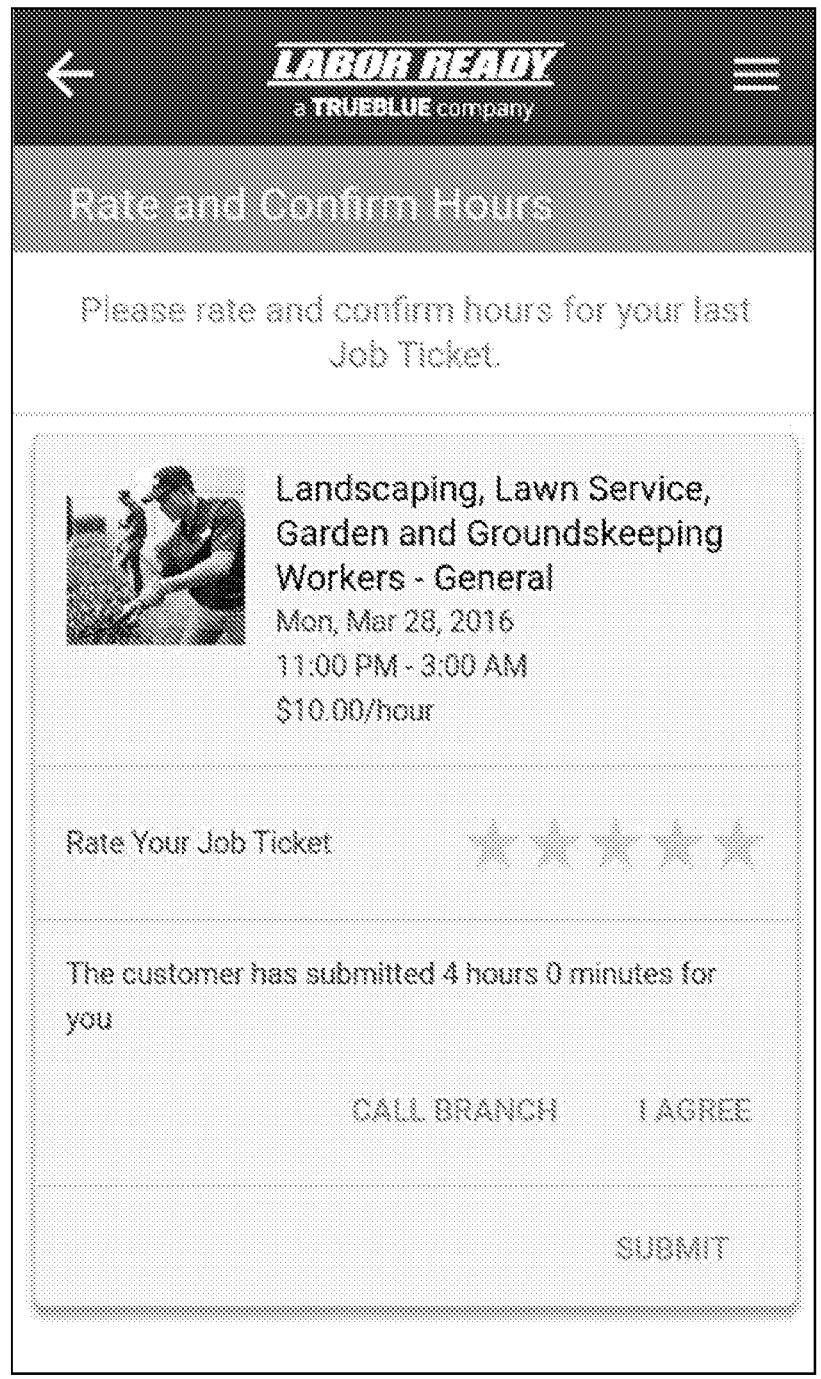

In certain embodiments and as shown in FIG. 7B, a confirmation message may be presented in response to a job being accepted to thereby confirm the worker's acceptance of the respective job of the job card. Once the job has been accepted, a job ticket is accessible via the worker interface as shown in FIG. 7C. After the job has been completed, a job ticket can be interacted therewith by the worker using their respective mobile device to provide a rating of the job. Furthermore, the job ticket can be populated with data stored at the server processing system 310 indicative of an amount of time which was completed by the worker which was submitted by the respective entity to the server processing system 310.

Figure 7D:
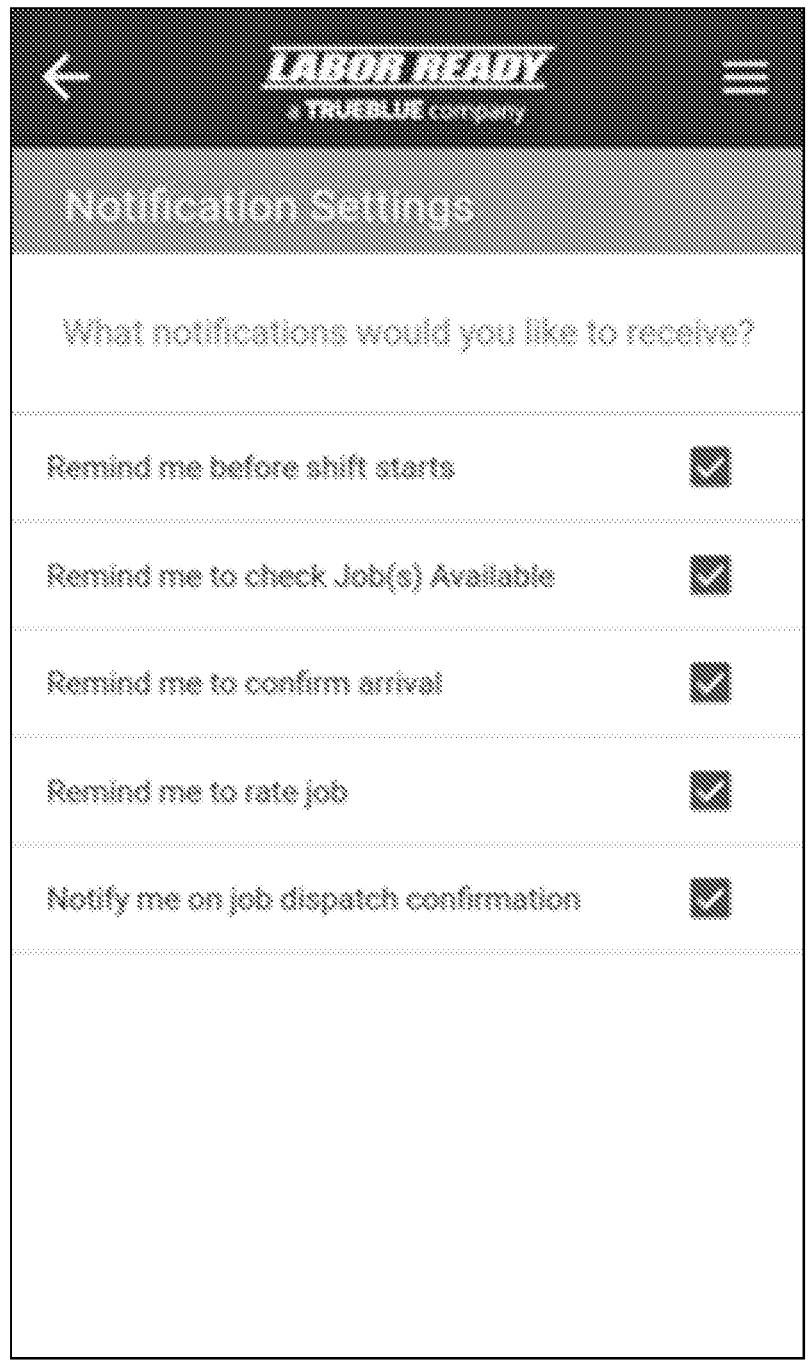
Figure 7E:
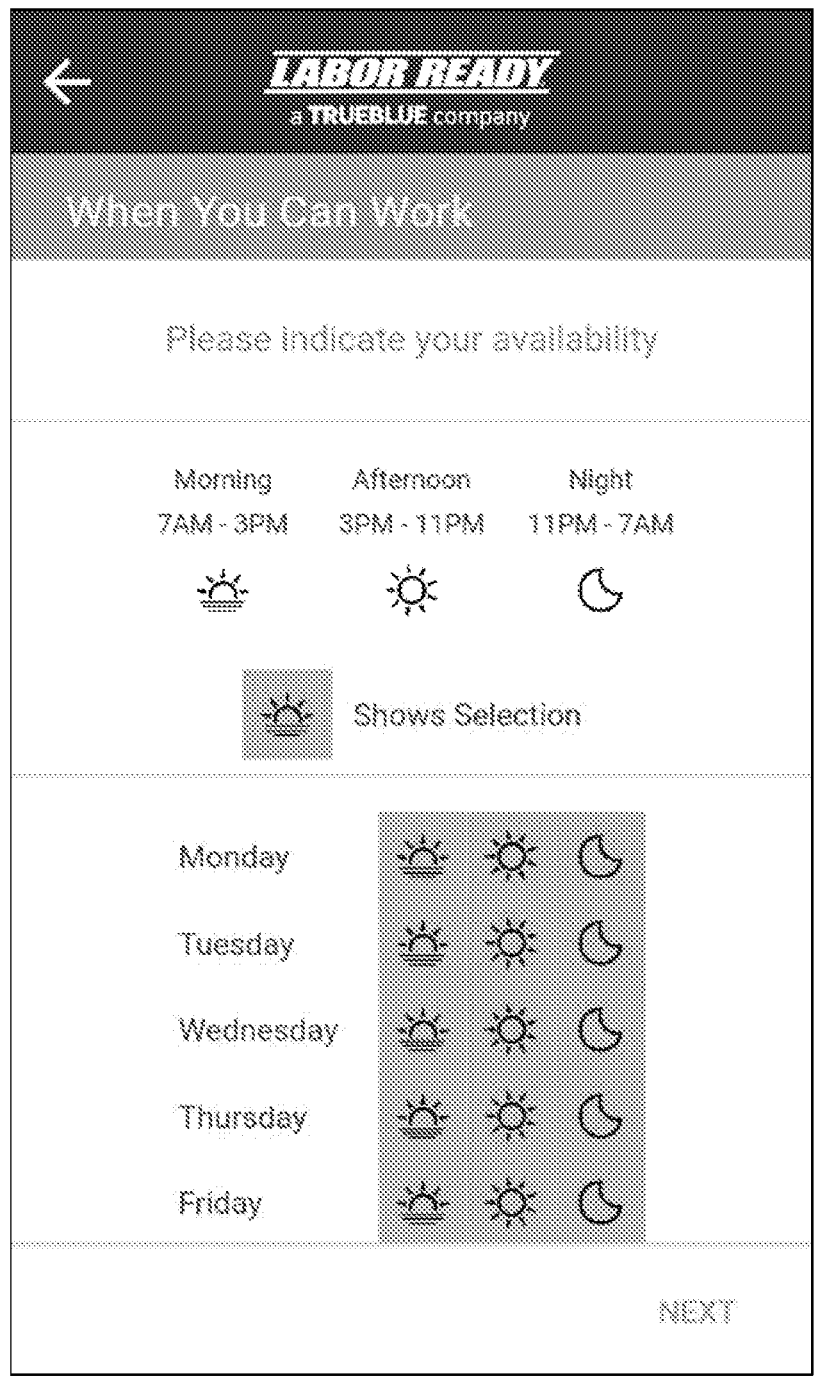

As shown in FIG. 7D, the worker can interact with the worker interface to define specific notification settings. For example, notification settings can be set by the worker in relation to whether a reminder should be presented prior to the start of a job, whether to present a reminder to check new job matches, whether a reminder should be presented for the worker to interact with the worker interface to confirm their attendance at the job location, whether a reminder should be presented to rate a job, and whether a notification should be presented on a job dispatch confirmation.

The mobile device 370 determines if any remaining job cards in the stack 675 have yet to be presented to the worker. In response to there being one or more remaining job cards to be presented, the next job card is presented from the job card stack 675. However, in response to there being no remaining job cards in the job stack 675 to be presented, the mobile device 370 transfers the recorded feedback data 660 to the server processing system 310 for storage and analysis. The mobile device 370 may additionally generate and transfer a job card stack request that is transferred to the server processing system 310. However, it is possible that the transfer of the feedback data 660 to the server processing system 310 acts as a stack request such that in response to receiving the feedback data 660, the server processing system 310 generates further stack data 670.

The learned profile engine 330 of the server processing system 310 analyses the feedback data 660 to determine whether modifications to the worker profile are required. In particular, the learned profile engine 330 can apply discrete choice analysis using the feedback data 660 to determine whether one or more user profile properties can be concluded or whether one or more existing profile properties of the respective worker profile require modification.

The server processing system 310 is configured to determine, based on the results of the analysis performed by the learned profile engine 330, if one or more preferences of the worker profile require to be stored or updated for the respective worker. In response to a positive determination, the server processing system 310 stores or updates the one or more user profile properties for the respective worker.

In a further embodiment, other interactions by the worker with the presented job cards via the mobile device 370 can be recorded by the application 380 in the memory of the mobile device 370 and transferred as part of the feedback data 660 to the server processing system 310 for analysis. For example, the amount of time spent by the worker reviewing the job card or interactions with the may be transferred to the sever processing system for analysis by the learned profile engine. Interactions with job cards and other interfaces of the application can be also be geo and date/time stamped, wherein this data is transferred back to the server processing system 310 for use in the matching process.

In one variation, a plurality of similar job cards or worker cards may be presented side-by-side on the mobile device 370, 371. The worker or the entity can then interact with the user interface to indicate the desirability, undesirability of the one or more of the job cards or worker cards. The learned profile engine 330 can then perform a pairwise comparison based on the feedback data 670 associated with the simultaneous presentation of the content to determine whether one or more profile properties of the worker profile or entity profile can be derived.

In one variation, the worker is alternatively able to swipe the job card in a substantially upwards direction to indicate that there are specific elements of the job card that the user wishes to provide preferences for, rather than accepting the job indicated by the job card. The preferences can be provided back to the server processing system 310 for analysis by the learned profile engine 330.

In preferable forms, the server processing system 310 presents a confirmation request to the user via the mobile device 370, 371 indicating a preference which has been concluded by the learned profile engine 330 via analysis of the feedback data 670. The user is able to then provide a positive or negative response to the confirmation request, wherein the user profile of the user is updated in response to a positive response. In preferable forms, the user is able to view the user profile generated by the server processing system 310 via the application 380 executing on the mobile device 370, 371.

In one form, the application 380 may be embedded within a parent application. For example, the application 380 may be a module of a social network application.

It will be appreciated that the worker profile which is presented as part of a worker card stack 674 is a portion of the worker profile record that is stored in the user profile database 360. For example, preferences of the worker which have been determined by the system over time would not be information which would be shared with an entity. Therefore, only a selection of the information in the worker profile record is presented to the entity for review.

Figure 8A:
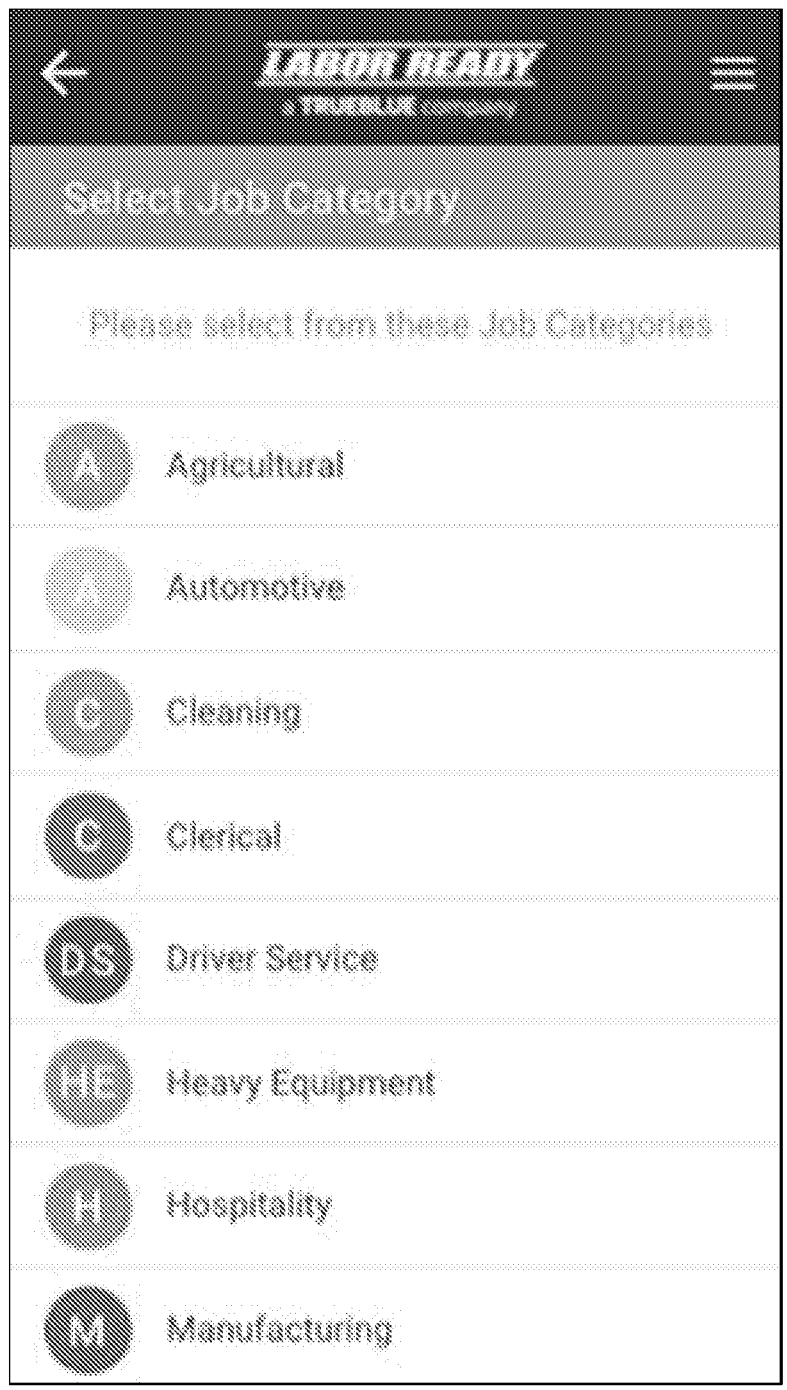
FIGS. 8A to 8G show carious example interfaces of the employer interface.
Figure 8B:
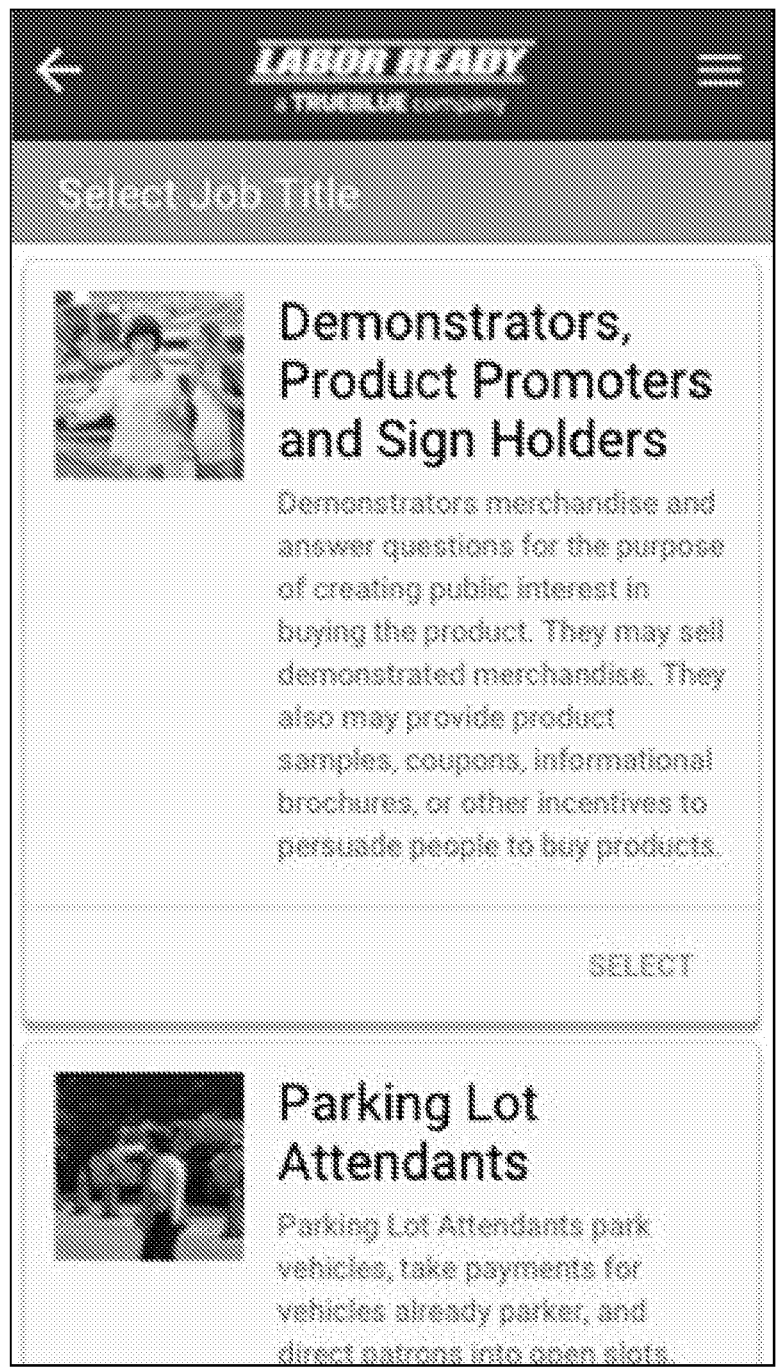
Figure 8C:
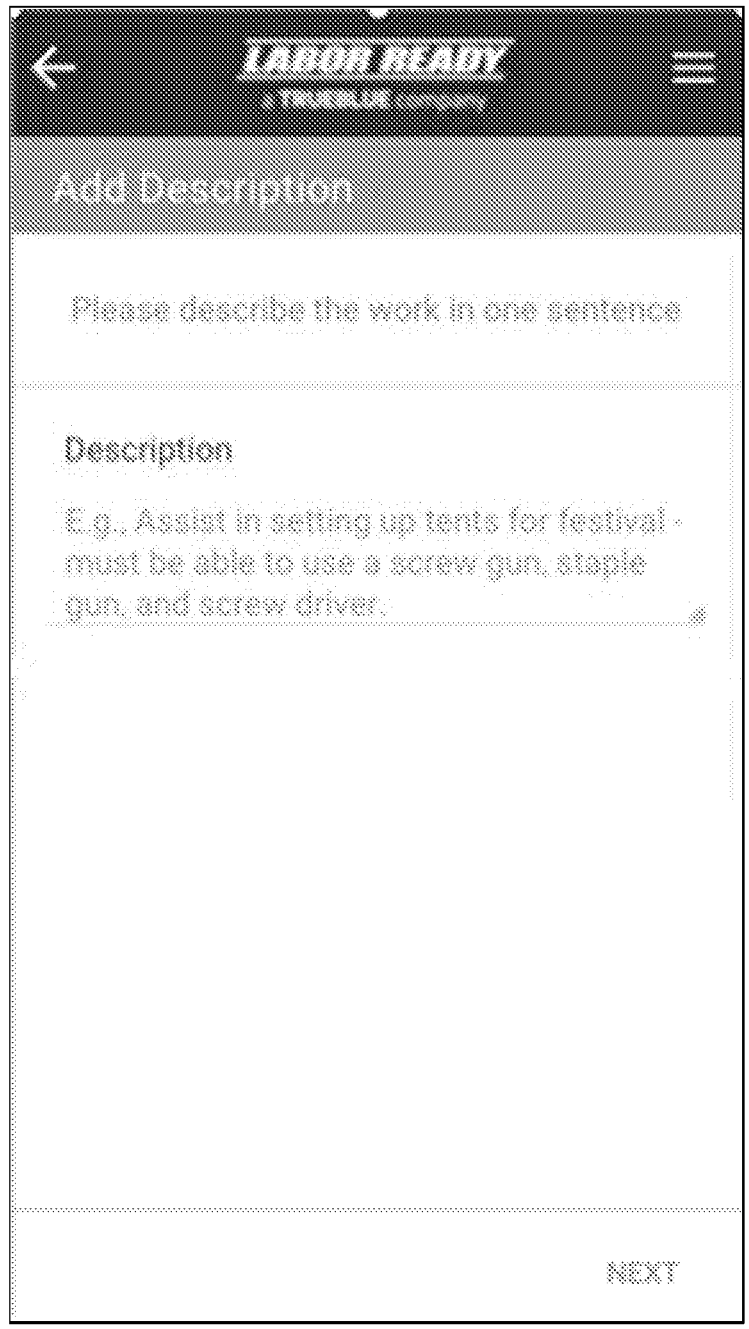
Figure 8D:
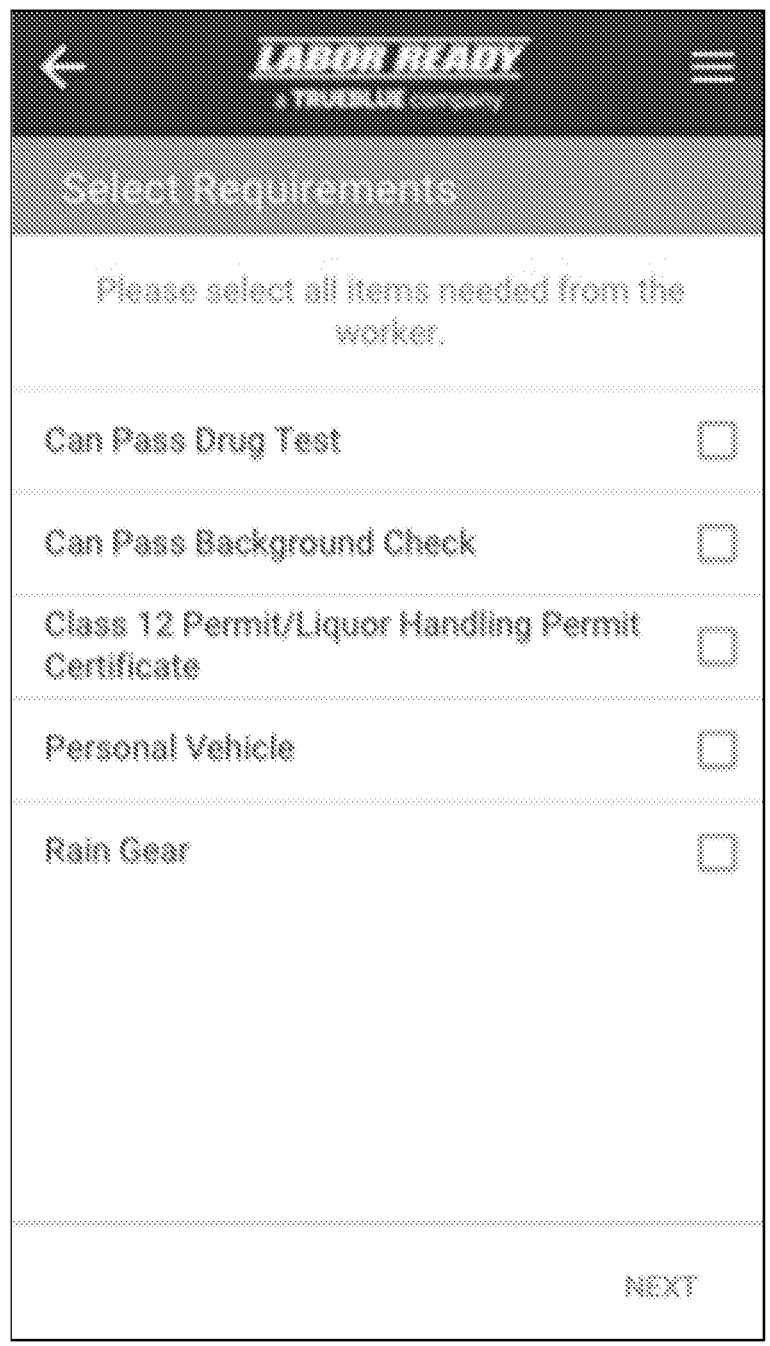
Figure 8E:
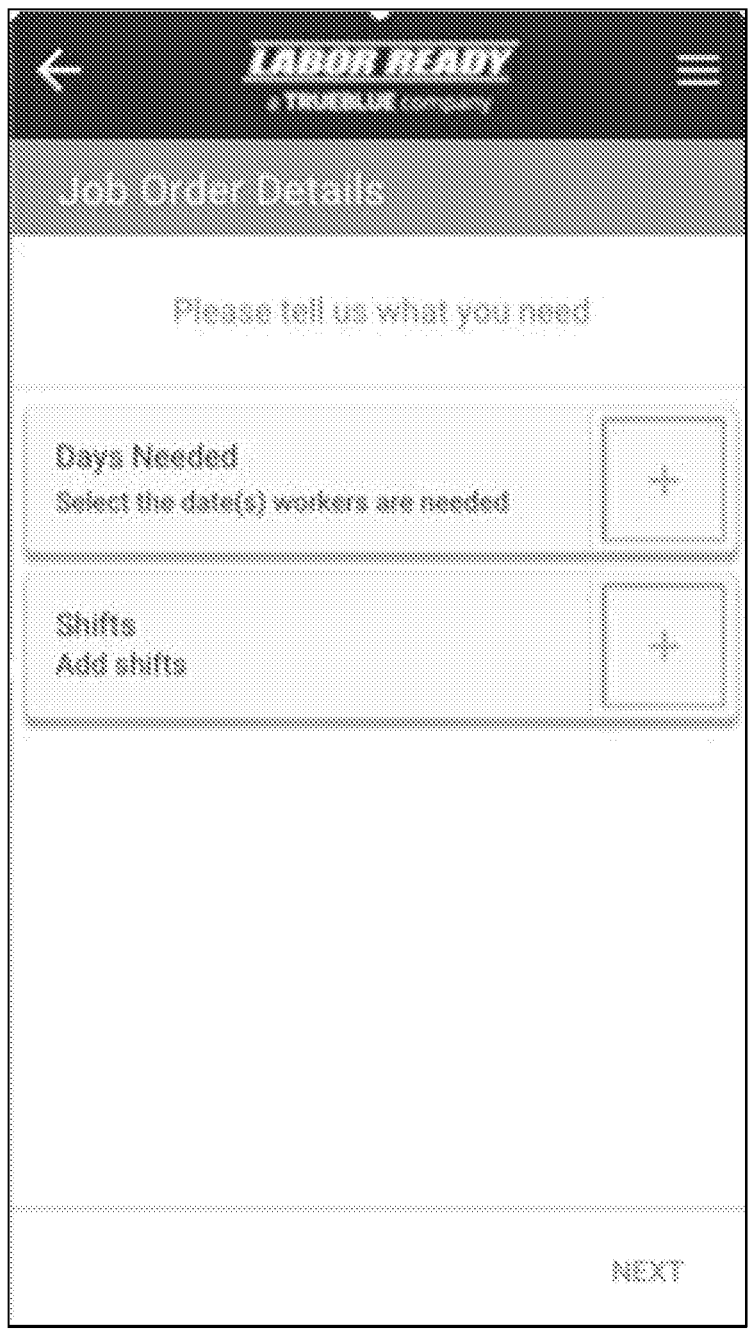
Figure 8F:
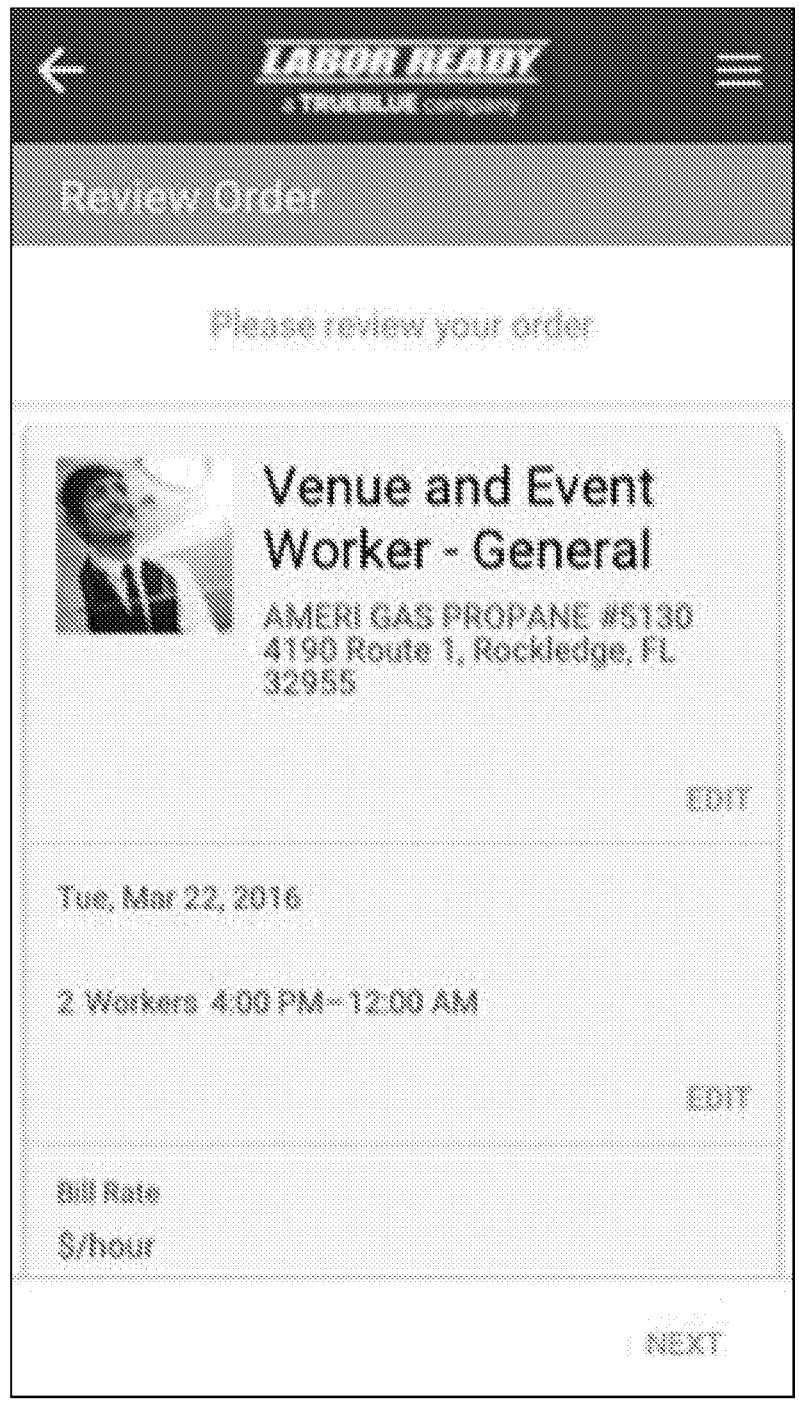
Figure 8G:
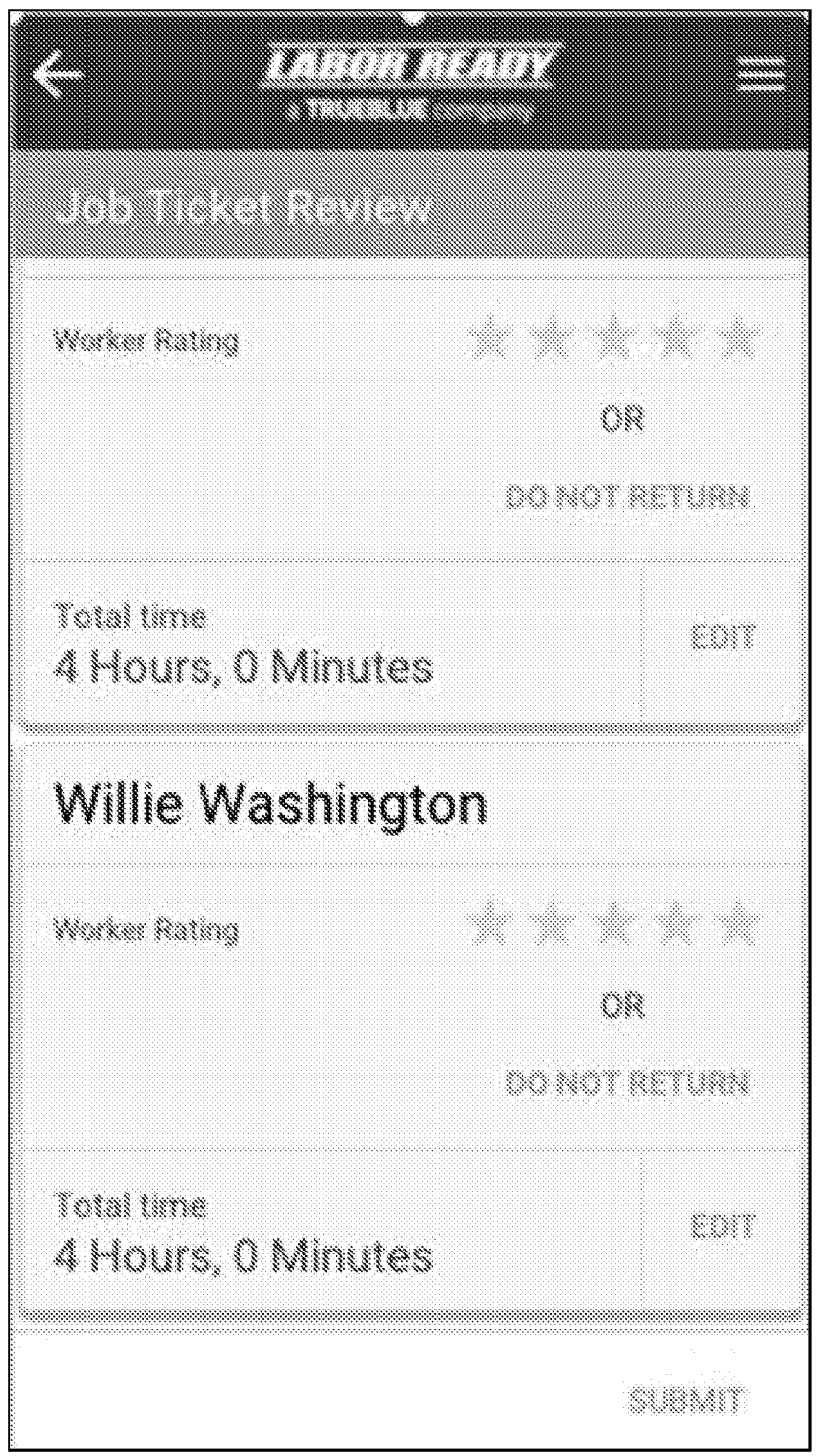

Referring to FIGS. 8A to 8G there are shown various screenshots of the entity interface presented via the respective entity mobile device for defining a job order. In particular, in FIG. 8A the entity can define a job order for a job by selecting from a predefined job category list. In FIG. 8B, a job title from the selected job category can be selected. As shown in FIG. 8C, the entity can also include a brief description of the job. The entity can also define the location of the job which can either be input by the entity or determined based on the location receiver of the entity's mobile device. As shown in FIG. 8D, a list of common job requirements for the selected industry and job title are presented within the entity interface, wherein the entity can select one or more of the requirements to further define the job. As shown in FIG. 8E, the entity can input the number of days required to complete the job. Furthermore, the entity can define shifts for the job. A job order summary can then be presented to the entity as shown in FIG. 8F to review and confirm. In the event that the job order to accurate, the job order is submitted to the server processing system 310 thereby defining one or more available jobs which are stored in the database. When the job has been completed by the worker, the entity can interact with a job ticket interface of the worker interface as shown in FIG. 8G to submit the time completed by the worker and a worker rating which can be transferred back to the server processing system 310 for updating the entity profile and the respective worker profile.

Figure 10:
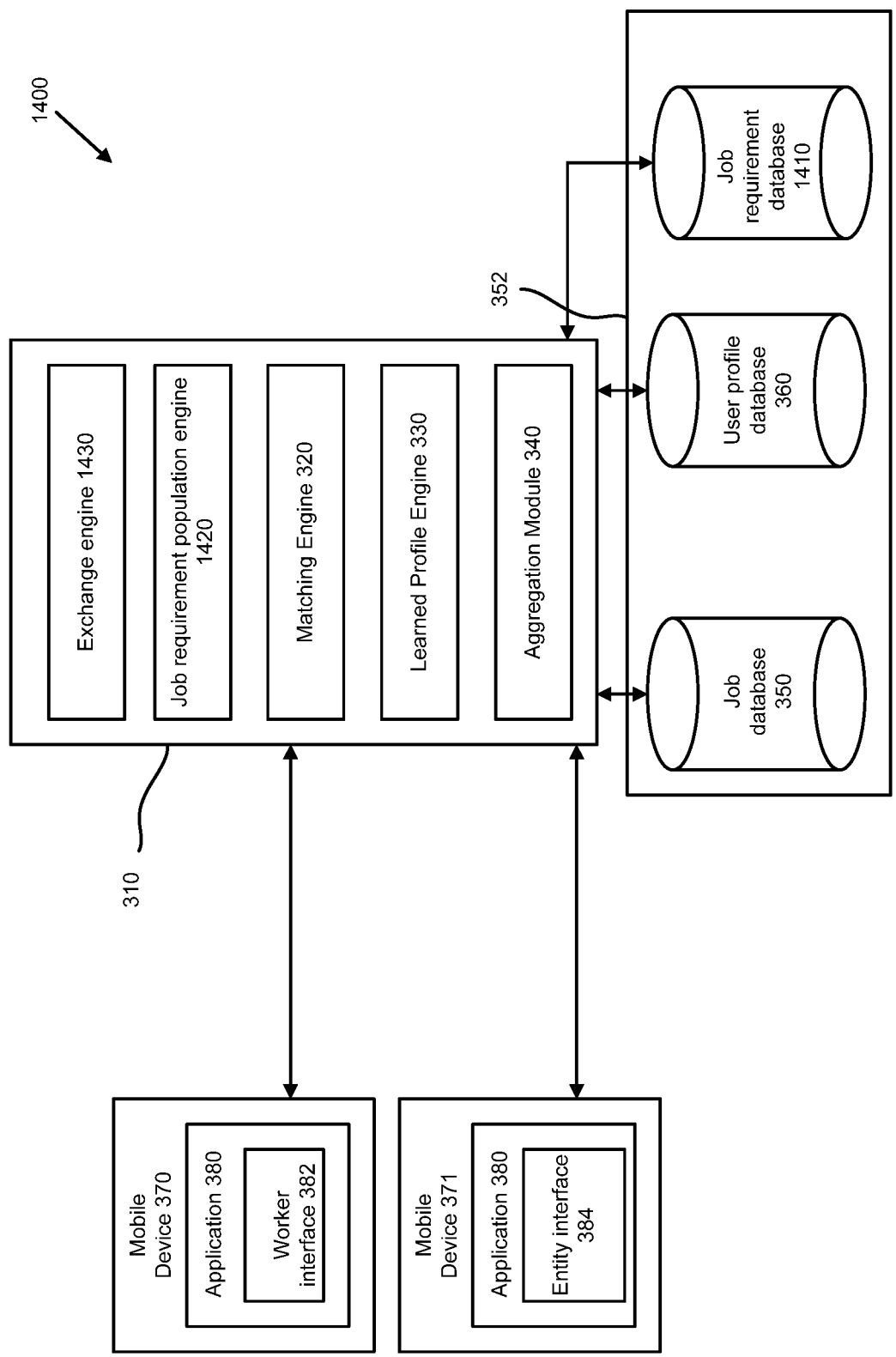
FIG. 10 illustrates a block diagram representing a further example system for enabling matching of workers and jobs defined by an entity.

Referring to FIG. 10 there is shown a further example system diagram. In particular, the system 1000 is largely based on the system 300 described earlier. Components marked with the same reference numeral operate in the same manner as described earlier in this document. In addition, the system 1400 includes a job requirement database 1410, a job requirement population engine 1420, and an exchange engine 1430.

Figure 11:
FIG. 11 illustrates a block diagram representing a plurality of data sources for job requirements to be used by the system of FIG. 10.

The job requirement engine 1420 is configured to determine a threshold number of common job requirements 1510 for job categories based on a plurality of data sources. The determined job requirements for each job category can be stored in the job requirements database 1410. The job requirements engine 1420 can operate continuously, or periodically. In one form, the job requirement engine 1420 is configured to aggregate the job requirements 1510 listed in job orders stored in the job database 350 for a particular job category to identify a threshold number job requirements that are most commonly required by entity when seeking workers for filling a job. In addition, other sources 1520 may be utilised by the server processing system 310 for identifying job requirements for each job category as shown in FIG. 11 such as information from scraping one or more social networks associated with one or more entities, POS, Glassdoor/salary.com, direct entry, BLS/Census data, Chamber of Commerce, website of entities, Better Business Bureau, location receiver of one or more entity's mobile device 371, and state/licensing law. FIG. 11 also shows various data sources 1530 used by the server processing system 310 for identifying job requirements 1510 which are relevant for workers.

The exchange engine 1430 is configured to generate demand and supply metrics in relation to the supply of and the demand for workers. More specifically, the exchange engine 1430 generates one or more demand metrics indicative of the demand by entities for workers for various job titles having various job requirements. For example, the exchange engine 1430 can generate demand metrics indicating that there is currently a demand for one hundred bricklayers within Sydney, Australia. Additionally, the exchange engine 1430 can generate one or more supply metrics indicative of the supply of workers for various job titles having various job requirements. For example, the exchange engine 1430 may generate supply metrics indicating that there is currently a supply of fifty bricklayers within Sydney, Australia.

The exchange engine 1430 can additionally generate a discrepancy metric indicative of the discrepancy between the supply and demand metrics for various job titles for various job requirements. Continuing with the example, the exchange engine 1430 may generate a discrepancy metric indicative of an over demand for bricklayers in Sydney.

Figure 12:
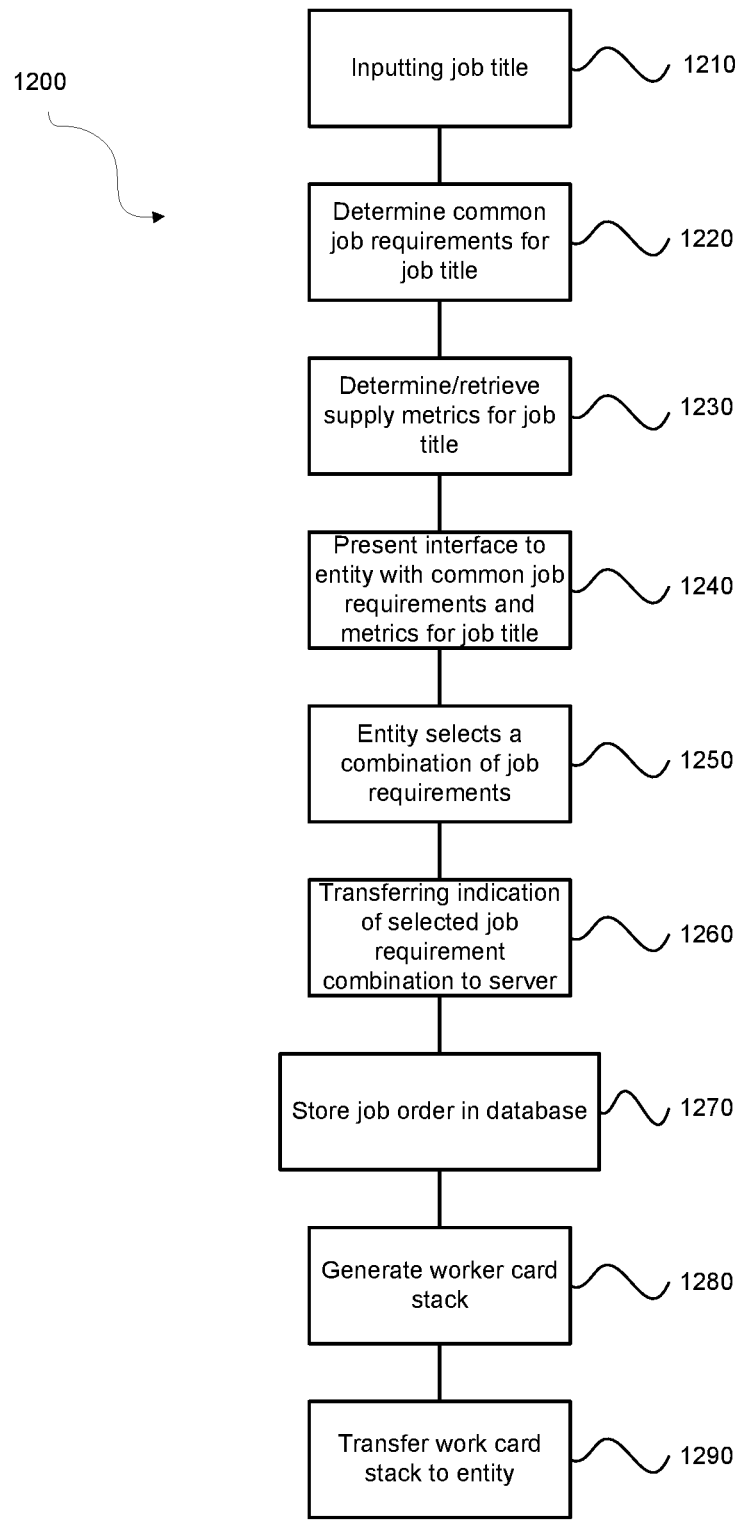
FIG. 12 illustrates a flowchart representing a method for presenting worker profiles to an entity using the system of FIG. 10.

Referring to FIG. 12 there is shown a flowchart representing a method 1200 performed by an entity.

In particular, at step 1210, the method 1200 includes the entity inputting a job title via an entity interface of the application 380 via the mobile device 371 that is transferred to the server processing system 310.

At step 1220, the method 1200 includes the server processing system 310 querying the job requirements database 1410 to determine a threshold number of common job requirements based on the job title. In one form, the threshold number of job requirements may be five job requirements, although this can be set and adjusted within the settings by the administrator of the server processing system 310.

At step 1230, the method 1200 includes the server processing system 310 determining or retrieving from the data store 352 supply metrics generated and/or stored by the exchange engine 1430 for the job title based on the combination of the threshold number of common job requirements. In particular, the server processing system 310 determines a supply metric for the most common job requirement which may be the location of the entity. The server processing system 310 may next determine a supply metric for the first most common job requirement in combination with the next most common job requirement, which in this example may be based upon location of the entity and salary/pay. The server processing system 310 may then determine a further supply metric based upon the next most common job requirement which may be location of the entity, in combination with salary/pay in combination with a driver's license. The server processing system 310 may then determine a further supply metric based upon the next most common job requirement which may be location of the entity, in combination with salary/pay, a driver's license, and availability (e.g. hours and days which the worker is available to work). As such, the server processing system 310 combines the previous job requirements with the next most common job requirement to determine a new supply metric.

At step 1240, the method 1200 includes presenting via the entity interface via the mobile device 371, a summary indicative of the list of the most common job requirements and the associated supply metrics. In particular, located substantially adjacent each job requirement is the corresponding supply metric. By providing an indication of the number of workers that are currently seeking a job based on specific job requirements, the entity can determine which job requirements should be required when seeking a worker. Effectively, the supply metric information simplifies the entity's process in identifying potential candidates for filling the job. For example, in the event that the entity had generated a job order based on very specific job requirements, the entity may be unlikely to fill the job order. This may then require the entity to blindly manipulate the combinations of job requirements in order to identify a sufficient supply of workers. However, the provision of the supply metrics within the entity interface provides the entity with an insight into the supply of workers for various combinations of job requirements, thus easily allowing the entity to determine a reasonable job requirement combination to fulfill the job order.

At step 1250, the method includes the entity selecting one or more of the job requirement combinations thereby defining the job order.

At step 1260, the method includes the selected job requirement combination being transferred to the server processing system 310 for storage in the database.

Optionally, at step 1270, the method includes the server processing system 310 generating a worker card stack based on the job requirement combination, the entity preferences and the various worker preferences. The matching engine of the sever processing system is configured to generate the worker card stack as discussed previously. It will be appreciated that the workers of the worker card stack are matched according to each worker meeting the job requirement combination specified by the entity.

At step 1280, the method includes transferring from the server processing system 310 to the mobile device 371 the worker card stack.

At step 1290, the method includes the entity progressing through the worker card stack as discussed in previous examples. In the event that a worker presented in the worker card stack is selected by the entity, the server processing system 310 generates a job card stack including the job being offered by the entity.

Figure 13:
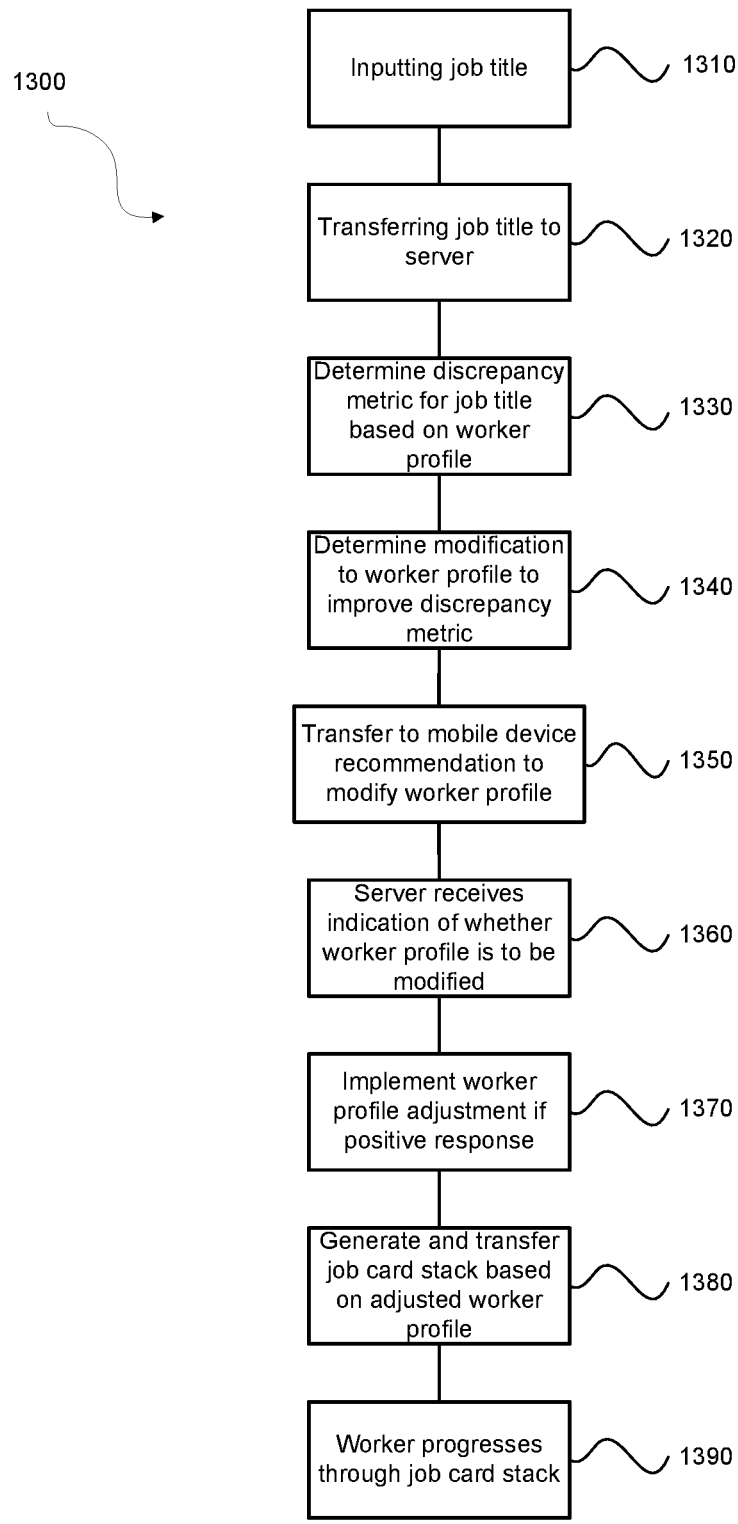
FIG. 13 illustrates a flowchart representing a method for presenting job cards indicative of matched jobs to a worker using the system of FIG. 10.

Referring to FIG. 13 there is shown a flowchart representing a method 1300 of a worker determining potential changes to their worker profile.

In particular, at step 1310, the method 1300 includes the worker inputting a job title via a worker interface presented via the application 380 executing upon mobile device 370.

At step 1320, the method 1300 includes the mobile device 370 transferring the job title to the server processing system 310.

At step 1330, the method 1300 includes the server processing system 310 determining, based on the job title and the worker profile of the worker, a discrepancy metric which meets or exceeds a threshold. In particular, the discrepancy metric may be indicative that there is an oversupply of workers based on the job title, the location, and various portions of the respective worker profile of the worker.

At step 1340, the method 1300 includes the server processing system 310 determining a modification to the worker profile which seeks to correct the discrepancy metric or at least be reduced for the worker. For example, the server processing system 310 may include one or more rules used to determine if an adjustment to one or more fields of the worker profile results in the discrepancy metric being reduced or corrected for the worker. In certain embodiments, a rule may be applied to reduce the salary/pay required by the worker, wherein the server processing system 310 utilises the exchange engine 1430 to determine whether this adjustment to the worker profile would be more favorable to the worker in relation to entity demand. Additionally or alternatively, another rule may be applied to increase the distance which the worker is willing to travel for a job, wherein the server processing system 310 utilises the exchange engine 1430 to determine whether this adjustment to the worker profile would be more favorable to the worker in relation to entity demand. Additionally or alternatively, another rule may be applied to list that the worker has a driver's license, wherein the server processing system 310 utilises the exchange engine 1430 to determine whether this adjustment to the worker profile would be more favorable to the worker in relation to entity demand. Additionally or alternatively, another rule may be applied to list that the worker has a submitted to and passed a background check, wherein the server processing system 310 utilises the exchange engine 1430 to determine whether this adjustment to the worker profile would be more favorable to the worker in relation to entity demand. Furthermore, another rule may be applied to adjust the temporal availability of the worker to perform a job, wherein the server processing system 310 utilises the exchange engine 1430 to determine whether this adjustment to the worker profile would be more favorable to the worker in relation to entity demand.

At step 1350, the method 1300 includes the server processing system 310 transferring a recommended worker profile adjustment to the mobile device 370 operated by the worker. In particular, the sever processing system may transfer to the mobile device 370 data indicative of the supply and demand metrics based on their worker profile, the discrepancy metric, and adjusted supply, demand and discrepancy metrics for each adjustment to the respective worker profile.

At step 1360, the method 1300 includes receiving input from the worker in relation to whether one or more adjustments to the worker profile should be adopted or requested.

In the event that the worker has agreed to adjust one or more portions of their worker profile, at step 1370 the method 1300 includes implementing the adjustments to the worker profile. In particular, fields of the worker profile may be adjusted such as lowering the minimum pay/salary field of the worker, increasing the travel distance field for the worker, and listing that the worker has a driver's license and/or adjusting the worker's temporal availability. In relation to recommendations such as the worker has submitted to a background check, the server processing system 310 can generate a request to a background check server processing system. Upon receiving a positive response from the background check server processing system in relation to the worker, the worker profile of the worker is adjusted accordingly.

At step 1380, the method 1300 includes generating a job card stack based upon the adjusted worker profile, the worker preferences, and entity preferences.

At step 1390, the method 1300 includes the progression through the job card stack via the application 380 executing upon the mobile device 370 by the worker as described in earlier examples.

As will be appreciated, due to the server processing system 310 determining a favorable adjustment to the worker profile in response to a discrepancy in supply of and demand for workers for a particular job title, the worker can more quickly identify a wider range of matched jobs.

In certain embodiments, the presentation of text within some job card of a job card stack may be dynamically generated by the server processing system 310 based on the worker profile of the worker progressing through the job card stack. In particular, the worker profile includes data indicative of worker preferences which are considered important to the worker as discussed in earlier examples. As such, when the server processing system 310 generates the job card stack, the server processing system 310 may reorder job requirements listed in at least some of the job cards according to the worker profile of the worker, such that the more relevant job requirements are presented earlier within the job card when viewed by the worker. For example, in the event that the worker profile is indicative of a preference for shiftwork, the server processing system 310 may rearrange a job requirements list of one or more of the job cards to indicate that the respective job is shiftwork. Therefore, when a list of job requirements are listed in a relevant job card, the shiftwork job requirement may be presented earlier in the job card.

In certain embodiments, the presentation of text within some worker cards of a worker card stack may be dynamically generated by the server processing system 310 based on the entity profile of the entity progressing through the worker card stack. In particular, the entity profile includes data indicative of requirements which are considered preferred by the entity as discussed in earlier examples. As such, when the server processing system 310 generates the worker card stack, the server processing system 310 may reorder worker fields listed in at least some of the worker cards according to the entity profile of the entity, such that the more relevant worker fields are presented earlier within each worker card within the worker card stack when viewed by the entity. For example, in the event that the entity profile of an entity is indicative of a preference for workers willing to undertake shiftwork, the server processing system 310 may rearrange one or more relevant worker fields of a worker card to indicate that the respective worker is available for undertaking shiftwork. Therefore, when worker fields are listed in a relevant word card, the shiftwork attribute may be presented earlier in a word card attribute list.

The system is preferably configured to maximize the two sides of the exchange by matching the best quality workers to the most attractive and highest paid jobs. Job matches are constantly adjusted to ensure that the exchange clears (i.e. all jobs are filled).

Rapid, distributed calculation of a network of available jobs and available workers initiated in an event based way, caused by each individual job interaction (either a user rejecting or accepting a job)

Job matching based on multiple different data points around the person and the job, taking into account personal history and their declared (and derived) preferences.

In preferable embodiments, the matching process is performed in response to receiving changes to the system such as a particular job being accepted or a particular worker no longer being available. As such, it is not necessary for the worker to log into the system to request a matching process to be performed as this has been performed in response to changes to the system which effect the worker.

As discussed above, the system is preferably used for matching temporary workers to on demand labor requests for entities. Generally, once a worker accepts a job, work commences no later than seventy-two hours after acceptance, however in most instances the work begins within approximately 12 hours after acceptance.

In certain embodiments, the worker mobile device can present a notification indicative of a pay status update.

In certain embodiments, the worker can interact with the worker interface presented via the application of the worker mobile device to indicate hours worked and breaks taken. This information can then be relayed by the server processing system 310 to the entity mobile device.

Whilst examples have been discussed in relation to a mobile device 370, 371 in the form of a smart phone, it will also be appreciated that other mobile computing devices such as tablet processing systems can equally be used.

In one form, the worker interface of the application executable upon the worker mobile device can enable the worker to select a button for a job ticket associated with an accepted job to indicate that the worker has arrived at the location of the job. The server processing system 310 can receive the indication of the worker having arrived at the job location and can generate and push a notification to the entity mobile device indicative of the arrival of the worker.

In one form, the application executable upon the worker mobile device may be configured to determine, based on current location data obtained from the location receiver whether the worker associated with the worker mobile device has entered a defined geographical area of the job location within a defined period of time of the start of the job. In response to automatically determining that the worker is located at the job location, data is automatically transferred to the server, without user input, to indicate the start of the job and also to relay to the entity that he/she has arrived at the job location. This feature can be particularly useful in the event that the worker forgets to indicate that they have arrived via the application such that the worker phone automatically detects the start of the job, or a recommencement, by determining when the current location data is indicative of a geographical boundary crossing event.

In another form, the application executable upon the worker mobile device may be configured to determine, based on current location data obtained from the location receiver whether the worker associated with the worker mobile device has exited a defined geographical area associated with the job location within a defined period of time of the end of the job. In response to a positive detection, the worker mobile device can automatically determine that the worker has stopped the job and that data can be transferred to the server processing system to record the end time of the job. This feature can be particularly useful in the event that the worker forgets to input the hours completed such that the worker phone automatically detects the end of the job, or a break, by determining when the current location data is indicative of a geographical boundary crossing event.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions, or alterations will be apparent to those skilled in the art without departing from the scope of the present invention.

While the present invention has been described with reference to certain embodiments, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method including:
   receiving, at a server processing system, job data indicative of a plurality of available jobs associated with one or more entities, wherein the job data includes entity requirements temporal job requirements, and a number of positions available for the each of the plurality of available jobs;
   receiving, at the server processing system, worker data of a plurality of workers, wherein the worker data is indicative of at least one of one or more skills, experience, one or more certifications, and a temporal availability of each worker;
   storing, by the server processing system, the job data and the worker data in a data store;
   determining, by the server processing system, entity preference data and worker preference data, the worker preference data being included in a worker profile stored in a user profile database;
   storing, by the server processing system, the entity preference data and the worker preference data in the data store;
   determining one or more matches by the server processing system, wherein each match includes a worker of the plurality of workers and one or more jobs of the plurality of available jobs, and wherein each match is determined based on the worker data, the worker preference data, the entity requirements and the entity preference data, such that the worker of the match has a temporal availability that aligns with the temporal job requirements of each of the one or more jobs of the match;
   transferring from the server processing system for each match of the one or more matches, data indicative of the one or more jobs of the match to a mobile device associated with the worker of the match;
   in response to receiving, by the server processing system from a mobile device associated with the worker of a match, feedback data indicative of whether a job of the one or more jobs of the match was accepted—
      transferring, from the server processing system to the respective entity for the job, data indicative of the respective worker of the job, and
      updating, by the server processing system, a number of positions available in the job data for the job,
      making unavailable, by the server processing system, the job from being matched to other available workers when the number of positions available equals a threshold number of positions,
      analyzing, using a learned profile engine implemented on the server processing system, the feedback data with a machine learning algorithm incorporating a weighting of the worker data for the respective worker and a user segmentation analysis of the worker data for the plurality of workers, and
      updating, using the learned profile engine, the worker profile in the user profile database based on the analyzing;
   in response to receiving, by the server processing system, updated job data for one or more updated jobs, updated entity preference data for one or more updated entities, updated worker data for one or more updated workers, or updated worker preference data for the one or more updated workers—
      determining, by the server processing system, a portion of the one or more entities to update, the portion of the one or more entities including each of the one or more updated entities and each entity associated with each of the one or more updated jobs,
      determining, by the server processing system, a portion of the plurality of workers to update, the portion of the plurality of workers including each of the one or more updated workers and each worker of a match including at least one of the one or more updated jobs,
      determining, by the server processing system in real time, one or more updated matches, each updated match comprising a worker of the portion of the plurality of workers or an entity of the portion of the one or more entities, and
      transferring, for each updated match of the one or more updated matches, data indicative and based on the updated worker profile of the one or more jobs of the updated match from the server processing system to a mobile device associated with the worker of the updated match such that the method provides increasingly relevant jobs to the worker.

2. The method according to claim 1, wherein the data transferred to at least some of the matched workers via their respective mobile device is indicative of a job card stack including a plurality of j ob cards.

3. The method according to claim 2, wherein the method includes:
   the server processing system obtaining, for at least some of the mobile devices, gesture data based on the respective worker's interaction with an input device of the mobile device;
   the server processing system generating the feedback data based on the gesture data; and
   the server algorithm using the rejection to change the jobs which are shown to the rejecting worker in future.

4. The method according to claim 3, wherein the gesture data includes:
   a first swiping gesture in a first direction in relation to one of the job cards to indicate acceptance of the respective job; and a second swiping gesture in a second direction opposite and parallel to the first direction in relation to one of the job cards to indicate declination of the respective job.

5. The method according to claim 1, wherein the worker data for each worker is indicative of temporal availability and wherein the entity requirements of each job include temporal job requirements, wherein the method includes the server processing system determining the matches further based on the temporal availability and the temporal job requirements.

6. The method according to claim 1, wherein the method includes the server processing system receiving rating data for one of the workers based on completion of the respective accepted job, wherein the method includes:
the server processing system updating, in real time, the matches in response to receiving the rating data; and
the server processing system transferring data to one or more mobile devices in response to an updated match for the one or more respective workers.

7. The method according to claim 1, wherein the worker data for each worker is further indicative of at least one of:
one or more selected industries which the worker is willing to accept a job within;
a match radius based on a preferred job location;
availability for work;
methods of transport available to the worker;
work history;
a worker rating;
a worker satisfaction rating and
social media habits of the worker.

8. The method according to claim 1, wherein the worker preference data for each worker is indicative of a distance which the respective worker is willing to travel.

9. The method according to claim 8, wherein the distance which the respective worker is willing to travel is determined based on:
the server processing system receiving, from the respective, a nominated distance to travel; and
the server processing system refining the nominated distance to travel based on the feedback data.

10. The method according to claim 1, wherein the method includes for each accepted job, presenting, via the respective mobile device, a reminder notification a predetermined time prior to a start time for the respective job.

11. The method according to claim 1, wherein the method includes receiving, from one of the workers, a cancellation of an accepted job, wherein the method includes:
the server processing system updating, in real time, the matches in response to receiving the cancellation, assessing the availability and matching quality of other matched workers to determine which workers are to be transferred information about this job;
the server processing system transferring data to the respective entity indicating the cancellation;
the server processing system transferring, in real time, data to one or more mobile devices in response to an updated match for the one or more respective workers; and
the server processing system updating future matching based on the cancellation.

12. The method according to claim 1, wherein the method includes:
receiving, at the server processing system from one of the workers who completed the respective accepted job, a worker satisfaction rating; and
updating, by the server processing system, the worker preference data according to the worker satisfaction rating.

13. The method according to claim 1, wherein the method includes presenting, via the respective mobile device including a location receiver, directions to a location of the accepted job determined based upon a current location determined by the location receiver.

14. The method according to claim 1, wherein the method includes:
receiving, at the server processing system, nominated workers from at least some of the one or more entities; and
transferring, from the server processing system, to the nominated workers, data indicative of the respective job which the respective entity has nominated the respective worker.

15. The method according to claim 2, wherein the method includes the server processing system dynamically using matching factors to produce a sorted order of job cards for the worker to view.

16. The method according to claim 1, wherein the jobs are contract jobs and temporary jobs.

17. The method according to claim 1, wherein the one or more entities include at least one of:
an employer of the workers; and
a customer of the employer of the workers.

18. A server processing system including a processor and a data store, wherein the processor is configured to:
receive, at a server processing system job data indicative of a plurality of available jobs associated with entities, wherein the job data includes entity requirements, temporal job requirements, and a number of positions available for the each of the available jobs;
receive, at the server processing system worker data indicative of a plurality of workers, wherein the worker data is indicative of at least one of one or more skills, experience one or more certifications, and a temporal availability of each worker;
store the job data and the worker data in the data store;
determine and store, in the data store, entity preference data and worker preference data, the worker preference data being included in a worker profile stored in a user profile database;
determine matches by the server processing system, wherein each match dynamically pairs a worker of the plurality of workers with one or more jobs of the plurality of available jobs, based on the worker data, the worker preference data, the entity requirements and the entity preference data, such that the worker of the match as a temporal availability that aligns with the temporal job requirements of each of the one or more jobs of the match;
transfer, from the server processing system for each match of the one or more matches, data indicative of, the one or more jobs of the match to a mobile device associated with the worker of the match;
in response to receiving, by the server processing system from a mobile device associated with the worker of a match, feedback data indicative of whether a job of the one or more jobs of the match was accepted—
transfer, from the server processing system to the respective entity for the job, data indicative of the worker of the job,
update a number of positions available in the job data for the job;

make unavailable, by the server processing system, the job from being matched to other available workers when the number of positions available equals a threshold number of positions, analyze, using a learned profile engine implemented on the server processing system, the feedback data with a machine learning algorithm incorporating a weighting of the worker data for the respective worker and a user segmentation analysis of the worker data for the plurality of workers, and update, using the learned profile engine, the worker profile in the user profile database based on the machine learning algorithm;

in response to receiving, by the server processing system, updated job data for one or more updated jobs, updated entity preference data for one or more updated entities, updated worker data for one or more updated workers, or updated worker preference data for the one or more updated workers— determine, by the server processing system, a portion of the one or more entities to update, the portion of the one or more entities including each of the one or more updated entities and each entity associated with each of the one or more updated jobs, determine, by the server processing system, a portion of the plurality of workers to update, the portion of the plurality of workers including each of the one or more updated workers and each worker of a match including at least one of the one or more updated jobs, determine, by the server processing system in real time, one or more updated matches, each updated match comprising a worker of the portion of the plurality of workers or an entity of the portion of the one or more entities, and transfer, for each updated match of the one or more updated matches, data indicative and based on the updated worker profile of the one or more jobs of the updated match from the server processing system to a mobile device associated with the worker of the updated match such that the method provides increasingly relevant jobs to the worker.

19. A non-transient computer readable medium including executable instructions which, when executed, configure a processor of a server processing system to:

receive, at the server processing system job data indicative of a plurality available jobs associated with entities, wherein the job data includes entity requirements, temporal job requirements, and a number of positions available for the each of the available jobs;

receive, at the server processing system worker data indicative of a plurality of workers, wherein the worker data is indicative of at least one of one or more skills, experience one or more certifications, and a temporal availability of each worker;

store the job data and the worker data in a data store;

determine and store, in the data store, entity preference data and worker preference data the worker preference data being included in a worker profile;

determine matches by the server processing system, wherein each match dynamically pairs a worker of the plurality of workers with one or more jobs of the plurality of available jobs, based on the worker data, the worker preference data, the entity requirements and the entity preference data, such that the worker of the match as a temporal availability that aligns with the temporal job requirements of each of the one or more jobs of the match;

transfer, from the server processing system for each match of the one or more matches, data indicative of, the one or more jobs of the match to a mobile device associated with the worker of the match;

receive, by the server processing system from at least some of the mobile devices, feedback data indicative of whether at least some of the matched jobs were accepted or declined;

in response to receiving, by the server processing system from a mobile device associated with the worker of a match, feedback data indicative of whether a job of the one or more jobs of the match was accepted— transfer, from the server processing system to the respective entity for the job, data indicative of the worker of the job, update a number of positions available in the job data for the job, make unavailable, by the server processing system, the job from being matched to other available workers when the number of positions available equals a threshold number of positions, analyze, using a learned profile engine implemented on the server processing system, the feedback data with a machine learning algorithm incorporating a weighting of the worker data for the respective worker and a user segmentation analysis of the worker data for the plurality of workers, update, using the learned profile engine, the worker profile in the data store based on the machine learning algorithm;

in response to receiving, by the server processing system, updated job data for one or more updated jobs, updated entity preference data for one or more updated entities, updated worker data for one or more updated workers, or updated worker preference data for the one or more updated workers— determine, by the server processing system, a portion of the one or more entities to update, the portion of the one or more entities including each of the one or more updated entities and each entity associated with each of the one or more updated jobs, determine, by the server processing system, a portion of the plurality of workers to update, the portion of the plurality of workers including each of the one or more updated workers and each worker of a match including at least one of the one or more updated jobs, determine, by the server processing system in real time, one or more updated matches, each updated match comprising a worker of the portion of the plurality of workers or an entity of the portion of the one or more entities, and transfer, for each updated match of the one or more updated matches, data indicative and based on the updated worker profile of the one or more jobs of the updated match from the server processing system to a mobile device associated with the worker of the updated match such that the method provides increasingly relevant jobs to the worker.

* * * * *